United States Patent [19]
Hoshi

[11] Patent Number: 6,021,163
[45] Date of Patent: Feb. 1, 2000

[54] INTER-UNIT DIGITAL SIGNAL TRANSMITTING METHOD, DIGITAL SIGNAL TRANSMITTER AND RECEIVER EQUIPMENT, DIGITAL SIGNAL TRANSMITTER, AND DIGITAL SIGNAL RECEIVER

[75] Inventor: Takayuki Hoshi, Kawasaki, Japan

[73] Assignee: Fujitsu Limited, Kawasaki, Japan

[21] Appl. No.: 08/340,258

[22] Filed: Nov. 16, 1994

[30] Foreign Application Priority Data

Jun. 15, 1994 [JP] Japan .................................. 6-133155

[51] Int. Cl.[7] .................................................. H04L 27/10
[52] U.S. Cl. ........................................... 375/272; 375/222
[58] Field of Search .................................. 375/222, 302, 375/303, 334, 272, 289, 219, 213, 211, 214; 379/98; 455/13.1, 14, 20

[56] References Cited

U.S. PATENT DOCUMENTS

| | | | |
|---|---|---|---|
| 3,603,881 | 9/1971 | Thornton | 325/30 |
| 3,772,596 | 11/1973 | Edwards | 325/13 |
| 4,022,988 | 5/1977 | Lentz et al. | 179/175.31 |
| 4,328,494 | 5/1982 | Goodall | 340/870.18 |
| 4,471,399 | 9/1984 | Udren | 361/64 |
| 4,471,491 | 9/1984 | Abe et al. | 455/2 |
| 4,606,049 | 8/1986 | Daniel | 375/45 |
| 4,627,078 | 12/1986 | Stoner | 375/45 |
| 4,745,601 | 5/1988 | Diaz et al. | 370/110.1 |
| 5,038,366 | 8/1991 | Motley et al. | 375/39 |
| 5,070,537 | 12/1991 | Ohira et al. | 455/67 |
| 5,099,473 | 3/1992 | Gupta et al. | 370/56 |
| 5,278,865 | 1/1994 | Amrany et al. | 375/8 |
| 5,309,562 | 5/1994 | Li | 395/200 |
| 5,321,736 | 6/1994 | Beasley | 379/58 |
| 5,339,309 | 8/1994 | Saito | 370/29 |
| 5,347,539 | 9/1994 | Sridhar et al. | 375/8 |
| 5,463,661 | 10/1995 | Moran, III et al. | 375/222 |
| 5,491,719 | 2/1996 | Sellin et al. | 375/213 |
| 5,631,928 | 5/1997 | Hossaer | 375/289 |

FOREIGN PATENT DOCUMENTS

| | | |
|---|---|---|
| 2157133 | 10/1985 | United Kingdom . |
| 2173675 | 10/1986 | United Kingdom . |
| 2251768 | 7/1992 | United Kingdom . |
| 2252479 | 8/1992 | United Kingdom . |

*Primary Examiner*—Stephen Chin
*Assistant Examiner*—Mohammad Ghayour
*Attorney, Agent, or Firm*—Greer, Burns & Crain, Ltd.

[57] ABSTRACT

Digital signal transmitter/receiver equipment includes a first transmitter/receiver unit that handles digital signals and a second transmitter/receiver unit connected to the first transmitter/receiver unit via a transmission line to subject a digital signal to both a modulation/demodulation process and a frequency conversion process. The object is to suppress the signal attenuation due to a cable connecting the first transmitter/receiver unit to the second transmitter/receiver unit. Each of the first and second transmitter/receiver units includes a first frequency-shift modulation unit that sets the frequency of the digital signal transmitted between the first and second transmitter/receiver units to a value lower than an intermediate frequency at a frequency conversion processed by the second transmitter/receiver unit, and a second frequency-shift demodulation unit for demodulating the digital signal subjected to a frequency-shift modulation.

12 Claims, 14 Drawing Sheets

INTER-UNIT DIGITAL SIGNAL TRANSMITTING METHOD, DIGITAL SIGNAL TRANSMITTER AND RECEIVER EQUIPMENT, DIGITAL SIGNAL TRANSMITTER, AND DIGITAL SIGNAL RECEIVER

BACKGROUND OF THE INVENTION

1) Field of the Invention

The present invention relates to an inter-unit digital signal transmitting method, a digital signal transmitter and receiver equipment, a digital signal transmitter, and a digital signal receiver.

2) Description of the Related Art

In recent years, with an increasing number of mobile telecommunications base stations, inter-cellular telecommunications between exchanges have been frequently utilized. In the radio telecommunications such as mobile telecommunications, as shown in FIG. 14, radio terminals are linked to the exchange 24 (EX) via the radio base station (BS) 23 covering a radio terminal area. Optical fiber cable telecommunications or radio telecommunications have been chiefly utilized to link the radio base station (BS) 23 to the exchange 24.

However, an increasing number of radio base stations 23 causes expensive work which requires laying optical fiber cables to link to new exchanges 24. Particularly, it is costly to network new optical fiber cables in urban areas. For that reason, it has been increasingly worthwhile to use wireless (radio) communications, instead of optical fiber cables, for telecommunications between the radio base station 23 and the exchange 24, because of the advantage of installation easiness and economy.

On the other hand, in order to realize a telecommunication between the radio base station 23 and the exchange 24, they each must include the transmitter unit and the receiver unit to exchange radio data. In this case, the transmitter in each radio base station modulates an electrical signal in the baseband to a signal in an intermediate frequency (IF) band, subjects the IF band signal to a RF band frequency conversion process, and then transmits the outcome.

Various limitations sometimes require that the radio base station 23 or exchange 24 be divided into a first unit for handling digital signals and a second unit for performing a frequency conversion process, each being installed at a different place. It has long been desired to perform an efficient data transmission with no signal distortion between the separated units.

In response to such a desire, digital signal transmitter/receiver equipment has been used as shown in FIGS. 10 to 12. The digital signal transmitter/receiver equipment is constituted of the first transmitter/receiver unit acting as the first unit and the second transmitter/receiver unit acting as the second unit. FIG. 10 is a schematic diagram showing a device that performs a baseband transmission between first and second units. FIG. 11 is a schematic diagram showing a device that performs an IF band transmission using two local sources. FIG. 12 is a schematic diagram showing a device that performs an IF band transmission using one local source.

Explanation will be made below for the devices described above.

First, the digital signal transmitter/receiver equipment shown in FIG. 10 will be explained. Numeral 1 represents the first transmitter/receiver unit that handles digital signals and 2 represents the second transmitter/receiver unit that subjects a digital signal to a modulation/demodulation process and a frequency conversion process.

The first transmitter/receiver unit 1 is connected to the second transmitter/receiver unit 2 via three cables: the communication lines 8a and 8b and the power source cable 8c. The digital signal is subjected to the baseband transmission via the transmission lines 8a and 8b.

The first transmitter/receiver unit 1 is chiefly installed indoors. The first transmitter/receiver unit 1 is constituted of the bipolar/unipolar converting means (hereinafter referred to B/U converting means) 5, the unipolar/bipolar converting means (hereinafter referred to U/B converting means) 9, the CMI encoding means (CMI COD) 6A, and the CMI decoding means (CMI DCOD) 7B.

The second transmitter/receiver unit 2 is chiefly installed outdoors. The second transmitter/receiver unit 2 is constituted of the transmitting unit including the CMI decoding means 7A, the main modulation unit (MOD) 10, the up-converter 11, the high-power amplifier 16 and the bandpass filter 17; the receiving unit including the bandpass filter 17, the low-noise amplifier 18, the down-converter 13, the main demodulation unit (DEM) 14, and the CMI encoding means 6B; and the circulator 12; the antenna unit 15; and the local oscillator 19.

At the signal transmission time, when the transmitter/receiver unit 1 receives digital signal data in the baseband, the B/U converting means 5 converts the digital signal data from a bipolar signal to an unipolar signal while the CMI encoding means 6A subjects the unipolar signal to a code mark inversion (CMI) encoding process.

The second transmitter/receiver unit 2 receives the encoded signal at the baseband frequency via the sending transmission line 8a. In the second transmitter/receiver unit 2, the CMI decoding means 7A decodes first the input signal. The clock extracting unit 7a arranged in the CMI decoding means 7A synchronizes with the CMI coded signal from the CMI encoding means 6A to time the CMI decoding and the modulation in the main modulation unit 10.

Thereafter, the main modulation unit (MOD) 10 inputs the data signal to modulate it to a signal in the intermediate frequency (IF) signal band. The up-converter 11 receives the local signal from the local oscillator 19 to convert the IF frequency band data signal into a RF frequency band signal. The resultant signal is amplified by the high-power amplifier 16 and then transmitted from the antenna unit 15 by way of the bandpass filter 17 and the circulator 12.

At the signal receiving time, the signal is transmitted along the reverse path to that at the transmission time. That is, the signal received with the antenna unit 15 is input to the down-converter 13 by way of the circulator 12, the bandpath 5, filter 17 and the low-noise amplifier 18.

Next, the down-converter 13 converts the data signal from the RF frequency band to the IF frequency band. Then, the main demodulation unit (DEM) 14 demodulates the IF frequency band signal into the baseband signal and then the CMI encoding means 6B subjects the resultant signal to the CMI encoding process.

The resultant signal in a baseband frequency band is input to the first transmitter/receiver unit 1 via the receiving transmission line 8b. In the first transmitter/receiver unit 1, the CMI decoding means 7B decodes the signal and the U/B to converting means 9 converts the resultant signal into a bipolar signal. The clock extracting unit 7b is similar to the clock unit 7a arranged together with the CMI decoding means 7A.

Next the digital signal transmitter/receiver unit 2 shown in FIG. 11 will be explained briefly. Like the configuration shown in FIG. 10, numeral 1 represents the first transmitter/receiver unit that handles digital signals and 2 represents the second transmitter/receiver unit that subjects the digital signal to a modulation/demodulation process as well as a frequency conversion process.

The first transmitter/receiver unit 1 is connected to the second transmitter/receiver unit 2 via a pair of cables, or the transmission lines 8a and 8b, to transmit the digital signal in the IF frequency band via the same lines 8a and 8b.

That is, at a signal transmission time, the main modulation unit 10 in the first transmitter/receiver unit 1 modulates the digital signal data of the baseband to a signal in the IF frequency band. The resultant signal is transmitted to the second transmitter/receiver unit 2 via the transmission line 8a. The first transmitter/receiver unit 1 also includes the capacitors 20A-1, 20A-2, and coils 21A-1, 21A-2, 21A-1, and the second transmitter/receiver unit 2 also includes the capacitors 20B-1, 20B-2 and coils 21B-1, 21B-2, A DC power source is connected to one ends of the coils 21A-1, 21A-2, 21B-1, and 21B-2.

In the second transmitter/receiver 2, the amplifier 25A amplifies an input signal in the IF frequency band. Then, in response to the local signal from the local oscillator 19A, the up-converter 11 converts the data signal from the IF frequency band to the RF frequency band. The resultant signal is transmitted from the antenna unit 15 via the bandpass filter 17 and the circulator 12.

The signal received by the antenna unit 15 is inputted to the down-converter 13 via the circulator 12, the bandpass filter 17, and the low-noise amplifier 18.

In response to a local signal from the local oscillator 19B of which the oscillation frequency is different from that of the local oscillator 19A, the down-converter 13 frequency-converts the data signal from the RF signal band to the IF frequency band and then the amplifier 25B amplifies the converted signal. The resultant signal is transmitted to the main demodulation unit 14 via the transmission line 8b to modulate the resultant signal into a baseband signal.

In the configuration shown in FIG. 1, since the main modulation unit 10 and the main demodulation unit 14 are arranged on the side of the first transmitter/receiver unit 1, the attenuation of digital data due to a cable arranged between the transmitter/receiver units 1 and 2 can be relatively reduced by setting the IF frequency to a small value. However, two cables are needed between the transmitter/receiver units 1 and 2.

Next, the digital signal transmitter/receiver equipment will be explained with reference to FIG. 12. In this configuration, a signal cable (transmission line 8) is connected between the first transmitter/receiver unit 1 and the second transmitter/receiver unit 2. The digital signal is subjected to an IF transmission via the transmission line 8 shared for transmission and reception.

That is, in the configuration shown in FIG. 12, at the signal transmission time, the main modulation unit (MOD) 10 receives the digital signal data in the baseband input to the first transmitter/receiver unit 1 to modulate it to an IF frequency band signal. The modulated signal is transmitted to the second transmitter/receiver unit 2 via the hybrid circuit (composite and branch filter) 22A, 22B and the transmission line 8.

The transmission signal inputted to the second transmitter/receiver unit 2 is branched by the hybrid circuit 22B and then amplified by the amplifier 25A. Moreover, in response to a local signal from the local oscillator 19, the up-converter 11 converts the data signal in the IF frequency band into that in the RF frequency band.

The converted signal is amplified by the high-power amplifier 16 and the resultant signal is then transmitted to the antenna 15 via the bandpass filter 17 and the circulator 12.

At the signal receiving time, the signal is transmitted along the reverse path to that in the transmission time. That is, the signal received by the antenna unit 15 is inputted to the down-converter 13 via the circulator 12, the bandpass filter 17 and the low-noise amplifier 18.

The down-converter 13 converts the data signal in the RF frequency signal into a signal in the IF frequency band in accordance with the local signal from the local oscillator 19 shared as one for the transmitter. Then, the amplifier 25B amplifies the converted signal. Then, the hybrid circuit 22B combines the signal from the amplifier 25B with the signal from the amplifier 25A and then transmits the appropriate digital signal to the first transmitter/receiver unit 1 via the transmission line 8. In the first transmitter/receiver unit 1, the hybrid circuit 22A branches the received signal and the main demodulation unit (DEM) 14 demodulates the resultant signal in the IF frequency band into a signal in the baseband.

The configuration including the local oscillator 19 shared for transmission and reception allows the single cable (transmission line 8) to connect the first transmitter/receiver unit 1 to the second transmitter/receiver unit 2. However, as shown in FIG. 13, the IF frequency of the transmission system or the receiving system is fairly high. This causes a relatively large amount of signal attenuation due to cable losses.

As shown in FIG. 15, the radio base stations 23 are sometimes installed on general buildings (for example, office buildings) in an urban area. If a suitable space cannot be found, the indoor equipment (or the first unit) may be installed in a basement of the building and the outdoor equipment (or the second unit) may be installed on the roof thereof, as shown in FIG. 15. In this case, it may be required to lay very long cables between the indoor equipment and the outdoor equipment.

In the consideration of the installation easiness and the cable laying cost, it is most desirable to select an arrangement in which a signal cable is laid between the indoor equipment and the outdoor equipment, as shown in FIG. 12.

However, the problem arises that this configuration, where a single coaxial cable connects one equipment to another equipment, limits the coaxial cable laying to the length to which the device within the equipment can compensate for cable attenuation.

In other words, in order to lay a longer cable between the indoor equipment and the outdoor equipment without increased cable attenuation, the configuration requires using a cable with a thick inner conductor (with less signal attenuation) or an internal device with a large compensation characteristic for attenuation.

However, thickening an internal conductor in the cable results in a degraded flexibility of cabling as well as an equipment connection difficulty. Moreover, increasing the compensation characteristic of the internal device causes an increased manufacturing cost and bulky equipment.

SUMMARY OF THE INVENTION

The present invention is made to overcome the above mentioned problems. An object of the present invention is to provide an inter-unit digital signal transmitting method that can suppress the attenuation of a signal in a cable connecting the first transmitter/receiver unit to the second transmitter/receiver unit.

Another object of the present invention is to provide digital signal transmitter/receiver equipment that can suppress the attenuation of a signal in a cable connecting the first transmitter/receiver unit to the second transmitter/receiver unit.

Still another object of the present invention is to provide a digital signal transmitter that can suppress the attenuation of a signal in a cable connecting the first transmitter/receiver unit to the second transmitter/receiver unit.

Further still, another object of the present invention is to provide a digital signal receiver that can suppress the attenuation of a signal in a cable connecting the first transmitter/receiver unit to the second transmitter/receiver unit.

In order to achieve the above objects, according to the present invention, the inter-unit digital signal transmitting method which performs a digital signal modulation/demodulation process and a digital signal frequency conversion process between a first unit which handles digital signals and a second unit which is connected to the first unit via a transmission line is characterized by the step of performing a frequency shift keying or frequency-shift modulation of a digital signal transmitted between the first and second units so as to set the frequency of the digital signal transmitted between the first and second units to a value lower than an intermediate frequency at a frequency conversion processed by the second unit.

According to the present invention, in the digital signal transmitter/receiver equipment including a first transmitter/receiver unit that handles digital signals and a second transmitter/receiver unit connected to the first transmitter/receiver unit via a transmission line to perform a digital signal modulation/demodulation process and a digital signal frequency process, each of the first and second transmitter/receiver units is characterized by a frequency shift keying or frequency-shift modulation unit and a frequency shift keying or frequency-shift demodulation unit. The frequency-shift modulation unit performs a frequency-shift modulation of a digital signal transmitted between the first and second transmitter/receiver units so as to set the digital signal transmitted between the first and second transmitter/receiver units to a value lower than an intermediate frequency at a frequency conversion processed by the second transmitter/receiver unit. The frequency-shift demodulation unit demodulates a digital signal subjected to a frequency-shift modulation by a frequency-shift modulation unit confronting the second frequency-shift demodulation unit.

According to the digital signal transmitter/receiver equipment of the present invention, the transmission line between the first and second transmitter/receiver units is formed of a transmission line shared for transmission and reception.

According to the digital signal transmitter/receiver equipment according to the present invention, the transmission line between the first and second transmitter/receiver units has a separate sending transmission line and a receiving transmission line.

According to the present invention, the digital signal transmitter including a first transmitter that handles digital signals and a second transmitter that is connected to the first digital transmitter via a transmission line to perform a digital signal modulation process and a digital frequency conversion, is characterized by a frequency-shift modulation unit arranged in the first transmitter, for subjecting a digital signal transmitted between the first and second transmitters to a frequency-shift modulation to set the frequency of a digital signal transmitted between the first and second transmitters to a value lower than the intermediate frequency at a frequency conversion process performed by the second transmitter. The digital signal transmitter also includes a frequency-shift demodulation unit arranged in the second transmitter for subjecting a digital signal to a demodulation process, the digital signal being subjected to the frequency-shift modulation by the frequency-shift modulation unit arranged in the first transmitter.

According to the digital signal transmitter of the present invention, the first transmitter includes a bipolar/unipolar converting means and a CMI encoding means that are connected to the front stage of the frequency-shift modulation unit. The bipolar/unipolar converting means converts a bipolar signal into a unipolar signal, and the CMI coding means subjects the unipolar signal converted by the bipolar/unipolar converting means to a CMI encoding process. The second transmitter includes a CMI decoding means connected to the rear stage of the frequency-shift demodulation unit, for decoding the signal encoded by the CMI decoding means.

According to the present invention, the digital signal receiver includes a first receiver for subjecting a received digital signal to a demodulation process and a frequency conversion process and a second receiver connected to the first receiver via a transmission line for handling digital signals. A frequency-shift modulation unit is arranged in the first receiver for subjecting a digital signal transmitted between the first and second receivers to a frequency-shift modulation to set the frequency of a digital signal transmitted between the first and second receivers to a value lower than the intermediate frequency at a frequency conversion process performed by the first receiver. A frequency-shift demodulation unit is arranged in the second receiver for subjecting a digital signal to a demodulation process, the digital signal being one subjected to the frequency-shift modulation by the frequency-shift modulation unit arranged in the first receiver.

According to the digital signal receiver of the present invention, the first receiver includes a CMI decoding means connected to the front stage of the frequency-shift modulation unit for subjecting the demodulated unipolar signal to a CMI decoding process; and the second receiver includes a CMI encoding means and a bipolar/unipolar converting means each connected to the rear stage of the frequency-shift demodulation unit. The CMI decoding means decodes the unipolar signal encoded by the CMI encoding means; and the unipolar/bipolar converting means converts a unipolar signal decoded by the CMI decoding means into a bipolar signal.

According to the inter-unit digital signal transmitting method of the present invention, digital signals can be transmitted between the first and second units with almost no signal attenuation. The first and second units can be connected to each other at a lower cost without using an expensive cable with less signal attenuation. Since the first and second units can be largely separated from each other, there are no limitations to the installation places for the first and second units, whereby the flexibility for installation can be largely increased.

According to the digital signal transmitter/receiver equipment of the present invention, digital signals can be transmitted between the first and second transmitter/receiver units with almost no signal attenuation. The first and second transmitter/receiver units can be connected to each other at a lower cost without using an expensive cable with less signal attenuation. Since the first and second transmitter/receiver units can be largely separated from each other, there are no limitations to the installation places for the first and second transmitter/receiver units, whereby the flexibility for installation can be largely increased.

The equipment according to the present invention can be realized at a lower manufacturing cost by sharing the transmission line between the first and second transmitter/receiver units as a transmission line for transmission and reception.

The configuration of each of the first and second transmitter/receiver units can be simplified by separating the transmission lines between the first and second transmitter/receiver units into a sending transmission line and a receiving transmission line.

According to the digital signal transmitter of the present invention, digital signals can be transmitted between the first and second transmitters with low signal attenuation. This feature allows the first and second transmitters to be connected to each other at a lower cost without using an expensive cable with less signal attenuation. Since the first and second transmitters can be largely separated from each other, there are no limitations to the installation places for the first and second transmitters, whereby the flexibility for installation can be largely increased.

Even when the modulation/demodulation processing function is performed in the second transmitter arranged separately from the first transmitter, the system can reliably maintain synchronous timing, thus providing great value in practical use.

The digital signal receiver of the present invention enables a digital signal transmission between the first receiver and the second receiver with nearly no signal attenuation. This feature allows the first and second receivers to be connected to each other at low cost without using an expensive transmission line with less signal attenuation.

The feature that the first and second receivers can be installed separately from each other at a large distance eliminates the limitations for the installation places, thus improving the flexibility of installation.

DESCRIPTION OF THE PREFERRED EMBODIMENTS

Referring to the attached drawings, explanation will be made of a preferred embodiment according to the present invention.

Figure 1:
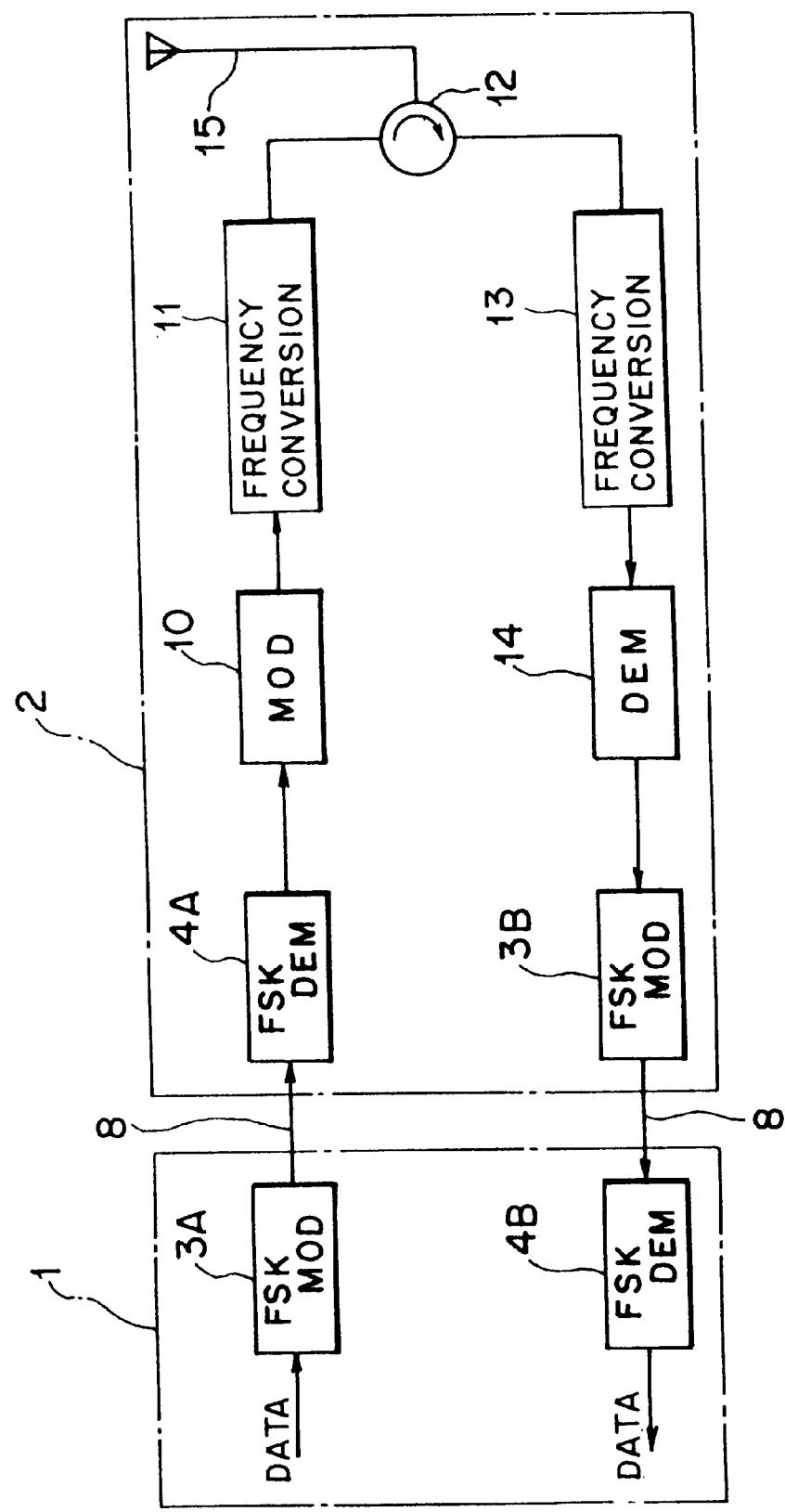
FIG. 1 is a block diagram showing an aspect of the present invention.

(a) Description of the the Present Invention:

FIG. 1 is a block diagram showing an aspect of the digital signal transmitter/receiver equipment according to the present invention. Referring to FIG. 1, numeral 1 represents a first transmitter/receiver unit and 2 represents a second transmitter/receiver unit. The transmission line 8 connects the first transmitter/receiver unit 1 to the second transmitter/receiver unit 2.

The first transmitter/receiver 1 includes a frequency shift keying or frequency-shift modulation unit (FSK MOD) 3A and a frequency shift keying or frequency-shift demodulation unit (FSK DEM) 4B. The second transmitter/receiver unit 2 includes a frequency-shift demodulation unit (FSK DEM) 4A, a main modulation unit (MOD) 10, frequency conversion units 11 and 13, a main demodulation unit (DEM) 14, a frequency shift keying or frequency-shift modulation unit (FSK MOD) 3B, a circulator 12, and an antenna 15. The frequency-shift modulation unit 3A in the first transmitter/receiver unit 1 subjects a digital signal transmitted between the units to a frequency shift keying or frequency-shift modulation to set the frequency of the digital signal to a value lower than the intermediate frequency at which the second transmitter/receiver unit 2 performs a frequency conversion. The frequency-shift demodulation unit 4A in the second transmitter/receiver unit 2 demodulates the digital signal which has been subjected to a frequency shift keying or frequency-shift modulation by the frequency-shift modulation unit 3A in the first transmitter/receiver unit 1.

The main modulation unit 10 modulates the digital signal demodulated by the frequency-shift demodulation unit 4A. The frequency conversion unit 11 subjects the modulated signal to a frequency conversion (up-conversion). The frequency conversion unit 13 subjects the receive data input from the antenna 15 to a frequency conversion (down-conversion). The main demodulation unit 14 demodulates the signal frequency-converted by the frequency conversion unit 13.

The frequency-shift modulation unit 3B in the second transmitter/receiver unit 2 subjects a digital signal transmitted between the units 1 and 2 to a frequency-shift modulation to set the frequency of the digital signal to a value lower than the intermediate frequency at which the first transmitter/receiver unit 1 performs a frequency conversion process. The frequency-shift demodulation unit 4B in the first transmitter/receiver unit 1 demodulates the digital signal subjected to a frequency-shift modulation by the frequency-shift modulation unit 3B in the second transmitter/receiver unit 2.

The transmission line 8 between the first and second transmitter/receiver units 1 and 2 may be a transmission line shared for transmission and reception. The transmission lines 8 between the first and second transmitter/receiver units 1 and 2 may be separated into a sending transmission line and a receiving transmission line, respectively.

Figure 2:
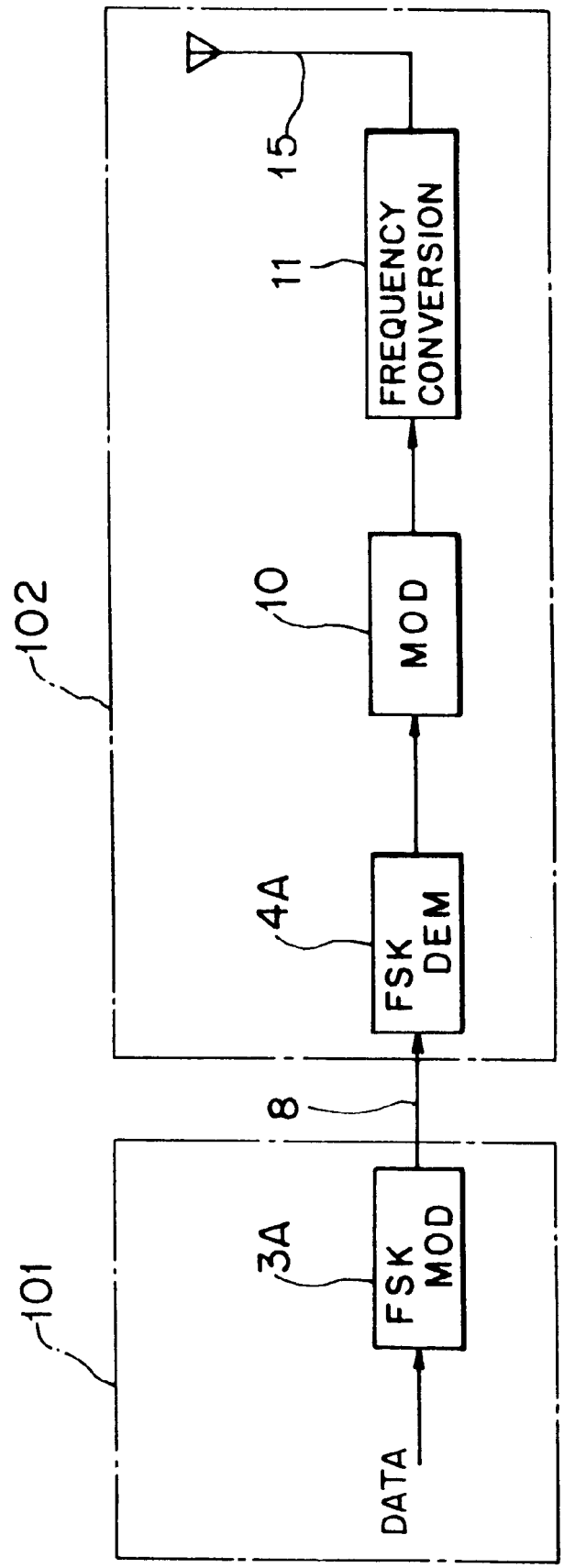
FIG. 2 is a block diagram showing an aspect of the present invention.

FIG. 2 is a block diagram showing an aspect of the digital signal transmitter according to the present invention. Referring to FIG. 2, numeral 101 represents a first transmitter unit and 102 represents a second transmitter unit connected to the first transmitter unit 101 via the transmission line 8.

The first transmitter unit 101 includes the frequency-shift modulation unit (FSK MOD) 3A. The transmitter 102 includes the frequency-shift demodulation unit (FSK DEM) 4A, the main modulation unit (MOD) 10, the frequency conversion unit 11, and the antenna unit 15.

Both a bipolar/unipolar converting means that converts a bipolar signal into a unipolar signal and a CMI encoding means that subjects the unipolar signal converted by the bipolar/unipolar converting means to a CMI encoding may be arranged at the front stage of the frequency-shift modulation unit 3A in the first transmitter 101. A CMI demodulating means that demodulates the signal encoded by the CMI encoding means may be arranged at the rear stage of the frequency-shift demodulation unit 4A in the second transmitter 102.

Figure 3:
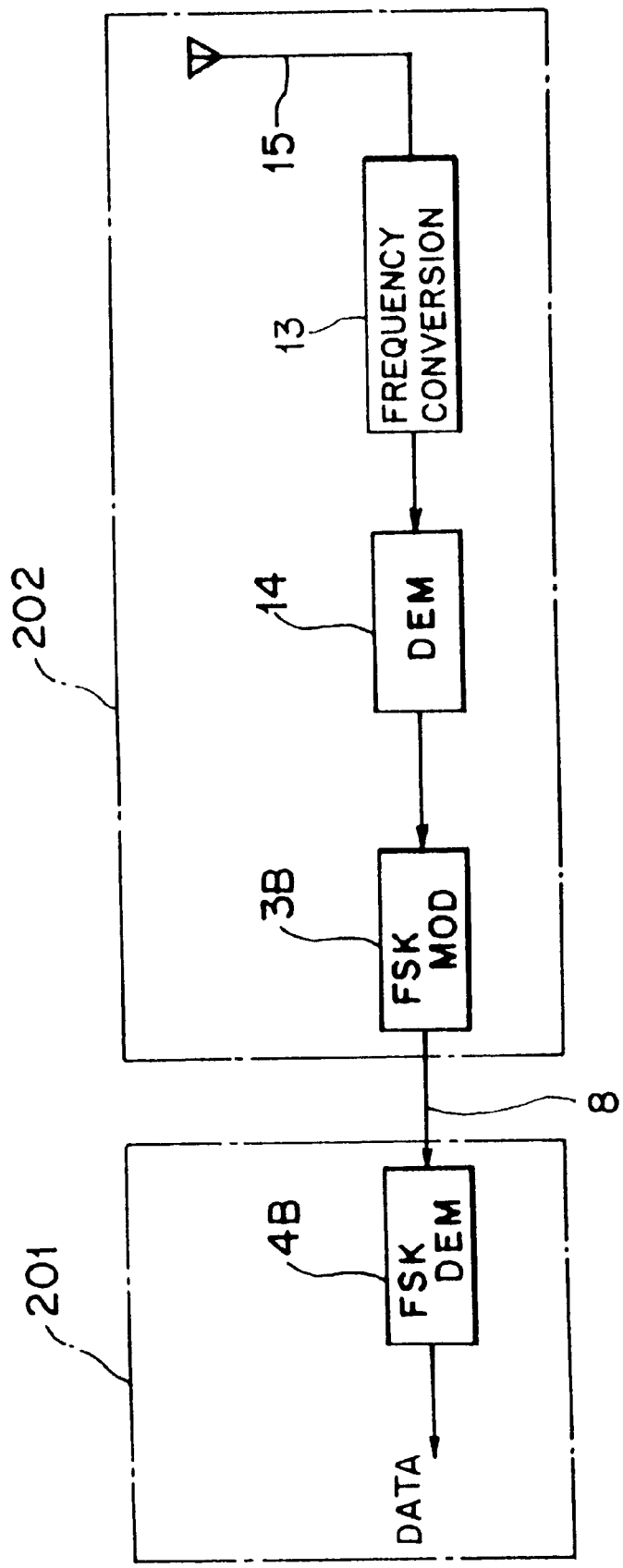
FIG. 3 is a block diagram showing an aspect of the present invention.

FIG. 3 is a block diagram showing an aspect of the digital signal receiver according to the present invention. Referring to FIG. 2, numeral 201 represents a second receiver unit and 202 represents a first receiver unit. The units 201 and 202 are connected via the transmission line 8.

The first receiver unit 202 is constituted of the antenna unit 15, the frequency conversion unit 13, the main demodulation unit 14, and the frequency-shift modulation unit (FSK MOD) 3B. The second receiver unit 201 includes the frequency-shift demodulation unit (FSK DEM) 4B.

A CMI encoding means that subjects a demodulated unipolar signal to a CMI encoding is arranged to the front stage of the frequency-shift modulation unit 3B in the first receiver unit 202. Both a CMI decoding means that decodes a unipolar signal encoded by the CMI encoding means and a unipolar/bipolar converting means that converts a unipolar signal decoded by the CMI decoding means into a bipolar signal are arranged at the rear stage of frequency-shift demodulation unit 4B in the second receiver 201.

According to the present invention, in order to perform a digital signal transmission between the first and second receiver units, the second receiver unit subjects a digital signal to both a modulation/demodulation process and a frequency conversion process.

By subjecting a digital signal between the first and second receiver units to a frequency-shift modulation, the frequency of the digital signal is converted to a frequency lower than the intermediate signal at which the second receiver unit performs a frequency conversion process. Thus, the attenuation of the digital signal in the transmission line connecting the first and second receiver units is greatly reduced.

According to the present invention, in the second transmitter/receiver unit 2 connected to the first transmitter/receiver unit 1 via the transmission line 8, shown in FIG. 1, each of the main modulation unit 10 and the main demodulation unit 14 subjects a digital signal to a modulation/demodulation process and each of the frequency conversion units 11 and 13 perform a frequency-shift modulation process.

In the frequency-shift modulation unit 3A in the first transmitter/receiver unit 1 and the frequency-shift modulation unit 3B in the second transmitter/receiver unit 2, the digital signal transmitted between the transmitter/receiver units 1 and 2 is subjected to a frequency-shift modulation to set the frequency of the digital signal to a value lower than the intermediate frequency at which the second transmitter/receiver unit 2 performs a frequency conversion process. In the frequency-shift demodulation unit 4A in the first transmitter/receiver unit 1 and the frequency-shift demodulation unit 4B in the second transmitter/receiver unit 2, the digital signal subjected to a frequency-shift modulation by each of the confronting frequency-shift modulation units 3A and 3B is demodulated.

Thus, the attenuation of digital signals in the transmission line 8 connecting the first and second transmitter/receiver units 1 and 2 can be reduced.

Where the transmission line 8 is formed as a shared transmission line for transmission and reception, it can transmit the transmission signal and the receive signal between the transmitter/receiver units 1 and 2.

Where the transmission lines are formed separately of a sending transmission line and a receiving transmission line, the transmission signal is transmitted between the first and second transmitter/receiver units 1 and 2 via the sending transmission line while the receive signal is transmitted between the first and second transmitter/receiver units 1 and 2 via the receiving transmission line.

According to the present invention as shown in FIG. 2, the frequency-shift modulation unit 3A in the first transmitter unit 101 subjects a digital signal transmitted between the transmitter units 1 to a frequency-shift modulation to set the frequency of the digital signal lower than the intermediate frequency at which the second transmitter 102 performs a frequency conversion process while the frequency-shift demodulation unit 4A in the first transmitter unit 102 demodulates the digital signal which has been subjected to the frequency-shift modulation by the frequency-shift modulation unit 3A in the first transmitter 101.

Thus, the attenuation of a digital signal in the transmission line 8 connecting the first and second receivers can be largely eliminated.

In the second transmitter 102 connected to the first transmitter unit 101 via the transmission line 8, the main modulation unit 101 modulates the digital signal while the frequency conversion unit 11 performs a frequency conversion.

Both the bipolar/unipolar converting means 5 and the CMI encoding means 6A are arranged at the front stage of the frequency-shift modulation unit 3A in the first transmitter unit 101. The CMI decoding means 7A is arranged at the rear stage of the frequency-shift modulation unit 3A. In this case, the bipolar/unipolar converting means 5 converts a bipolar signal into a unipolar signal. The CMI converting means 6A subjects the unipolar signal converted by the bipolar/unipolar converting means to a CMI encoding process. Then, the CMI decoding means 7A decodes the signal encoded by the CMI encoding means.

According to the present invention shown in FIG. 3, in the first receiver unit 202, the frequency conversion unit 13 frequency-converts the digital signal received and the main demodulation unit 14 subjects the resultant signal to a demodulation process.

The frequency-shift modulation unit 3B in the first receiver unit 202 subjects the digital signal transmitted between the first and the second receiver units 201 and 202 to a frequency-shift modulation to set the frequency of the digital signal to a value lower than the intermediate frequency used for the frequency conversion process in the first receiver unit 202.

Thus, the attenuation of a digital signal in the transmission line 8 connecting the first and the second receiver units 202 and 201 can be reduced.

The frequency-shift demodulation unit 4B in the first receiver unit 201 demodulates the digital signal subjected to the frequency-shift modulation by the frequency-shift modulation 3B in the first receiver unit 202.

The CMI encoding means 6B is arranged at the front stage of the frequency-shift modulation unit 3B in the first receiver unit 202 while the CMI decoding means 7B and the unipolar/bipolar converting means 9 are arranged at the rear stage of the unit 3B. In this case, the CMI encoding means 6B subjects the signal demodulated by the main demodulation unit 14 to a CMI encoding process.

The CMI decoding means 7B decodes the signal encoded by the CMI encoding means 6B. The unipolar/bipolar converting means 9 converts the unipolar signal decoded by the CMI decoding means 7B into a bipolar signal.

As described above, according to the present invention, the digital signal can be transmitted between the first and second units with almost no attenuation. This feature allows the first unit and the second unit to be connected to each other at a lower cost without using expensive transmission lines, and with less attenuation. Furthermore, since the first and second units can be largely separated from each other at a large distance, no limitation of the installation place for them greatly increases flexibility.

According to the present invention, the digital signal transmitter/receiver equipment includes a first transmitter/receiver unit 1 that handles digital signals and a second transmitter/receiver unit 2 connected to the first transmitter/receiver unit 1 via the transmission line 8 to perform a digital signal modulation/demodulation process and a digital signal frequency conversion process. Each of the first and second transmitter/receiver units 1 and 2 includes frequency-shift modulation units 3A, 3B and a frequency-shift demodulation unit 4A, 4RB. The frequency-shift modulation units 3A, 3B perform a frequency-shift modulation of a digital signal transmitted between the first and second transmitter/receiver units 1 and 2 so as to set the digital signal transmitted between the first and second transmitter/receiver units to a value lower than an intermediate frequency at a frequency conversion processed by the second transmitter/receiver unit. The frequency-shift demodulation units 4A, 4B demodulate a digital signal subjected to a frequency-shift modulation by a frequency-shift modulation unit confronting the second frequency-shift demodulation unit. Hence, the digital signal can be transmitted between the first transmitter/receiver units 1 and 2 with nearly no signal attenuation. This feature allows the first transmitter/receiver unit 1 and the second transmitter/receiver unit 2 to be connected to each other at a lower cost without using the expensive transmission line with less attenuation. Furthermore, since the first and second transmitter/receiver units 1 and 2 can be largely separated from each other at a large distance, no limitation of the installation place for them allows the largely increased flexibility for installation.

Since the transmission line 8 between the first and second transmitter/receiver units 1 and 2 is constituted of a transmission line shared for transmission and reception, the present equipment can be realized at a low manufacturing cost.

Since the transmission line 8 between the first and second transmitter/receiver units 1 and 2 is constituted separately of a sending transmission line and a receiving transmission line, the configuration of each of the first and second transmission/receiver units can be simplified.

According to the present invention, the digital signal transmitter, including a first transmitter 101 that handles digital signals and a second transmitter 102 that is connected to the first digital transmitter 101 via a transmission line 8 to perform a digital signal modulation process and a digital frequency conversion, is constituted of a frequency-shift modulation unit 3A arranged in the first transmitter 101, for subjecting a digital signal transmitted between the first and second transmitters to a frequency-shift modulation to set the frequency of a digital signal transmitted between the first and second transmitters to a value lower than the intermediate frequency at a frequency conversion process performed by the second transmitter 102. Also included is a frequency-shift demodulation unit 4A arranged in the second transmitter 102, for subjecting a digital signal to a demodulation process, the digital signal being one subjected to the frequency-shift modulation by the frequency-shift modulation unit 3A arranged in the first transmitter 101. Hence, the digital signal can be transmitted between the first transmitter/receiver units 1 and 2 without significant signal attenuation. This feature allows the first transmitter unit 1 and the second transmitter unit 2 to be connected to each other at a lower cost without using the expensive transmission line with less attenuation. Furthermore, since the first and second transmitter units 1 and 2 can be largely separated from each other at a large distance, no limitation of the installation place for them allows largely increased flexibility for installation.

The first transmitter 101 includes a bipolar/unipolar converting means and a CMI encoding means that are connected to the front stage of the frequency-shift modulation unit 3A, the bipolar/unipolar converting means converting a bipolar signal into a unipolar signal, the CMI coding means subjecting the unipolar signal converted by the bipolar/unipolar converting means to a CMI encoding process; and the second transmitter 102 includes a CMI decoding means connected to the rear stage of the frequency-shift demodulation unit 4A, for decoding the signal encoded by the CMI decoding means. Hence, even when the modulation/demodulation function is prepared within the second transmitter 102 arranged separately to the first transmitter 101, a synchronous timing can be reliably extracted so that the value in practical use is high.

According to the present invention, the digital signal receiver including a first receiver 202 for subjecting a received digital signal to a demodulation process and a frequency conversion process and a second receiver 201 connected to the first receiver 202 via a transmission line 8 for handling digital signals, is constituted of a frequency-shift modulation unit 3B arranged in the first receiver 202, for subjecting a digital signal transmitted between the first and second receivers to a frequency-shift modulation to set the frequency of a digital signal transmitted between the first and second receivers to a value lower than the intermediate frequency at a frequency conversion process performed by the first receiver 202. Also included is a frequency-shift demodulation unit 4B arranged in the second receiver 201, for subjecting a digital signal to a demodulation process, the digital signal being one subjected to the frequency-shift modulation by the frequency-shift modulation unit arranged in the first receiver 202. Hence, the digital signal can be transmitted between the first receiver units 202 and 201 with almost no signal attenuation. This feature allows the first receiver unit 202 and the second receiver unit 201 to be connected to each other at a lower cost without using the expensive transmission line with less attenuation. Furthermore, since the first and second receiver units 202 and 201 can be separated from each other at a large distance, no limitation of the installation place for them allows greatly increased flexibility for installation.

The first receiver 202 includes a CMI encoding means connected to the front stage of said frequency-shift modulation unit 3B for subjecting the demodulated unipolar signal to a CMI decoding process. The second receiver 201 includes a CMI encoding means and a bipolar/unipolar converting means that are connected to the rear stage of the frequency-shift demodulation unit 4B, the CMI decoding means decoding the unipolar signal encoded by the CMI encoding means. The unipolar/bipolar converting means converts a unipolar signal decoded by the CMI decoding means into a bipolar signal. Hence, even when the modulation/demodulation function is prepared within the second transmitter arranged separately to the first transmitter, a synchronous timing can be reliably extracted so that the value in practical use is high.

Description of the First Embodiment of the Present Invention:

Explanation will be made below of the first embodiment according to the present invention.

Figure 4:
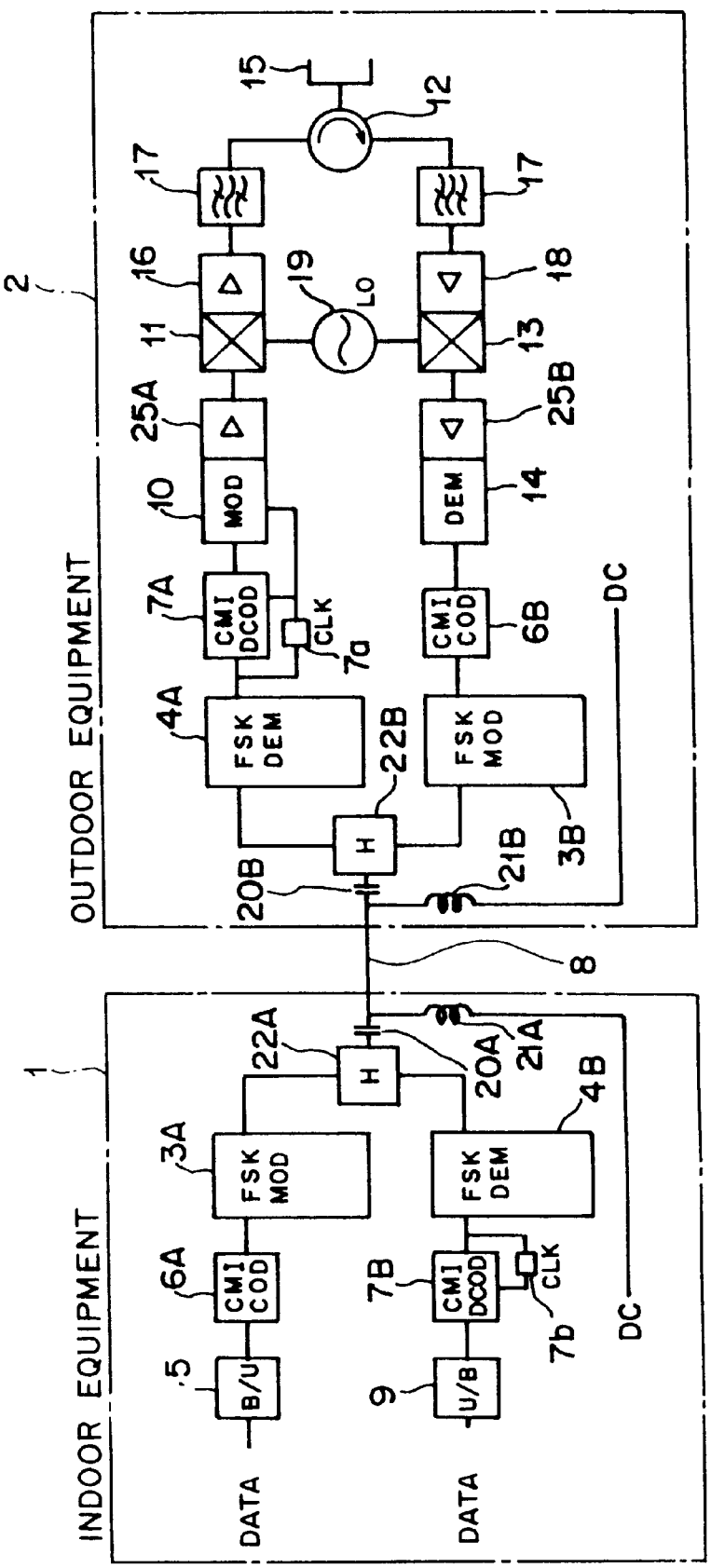
FIG. 4 is a block diagram showing the configuration of the first embodiment according to the present invention.
Figure 5:
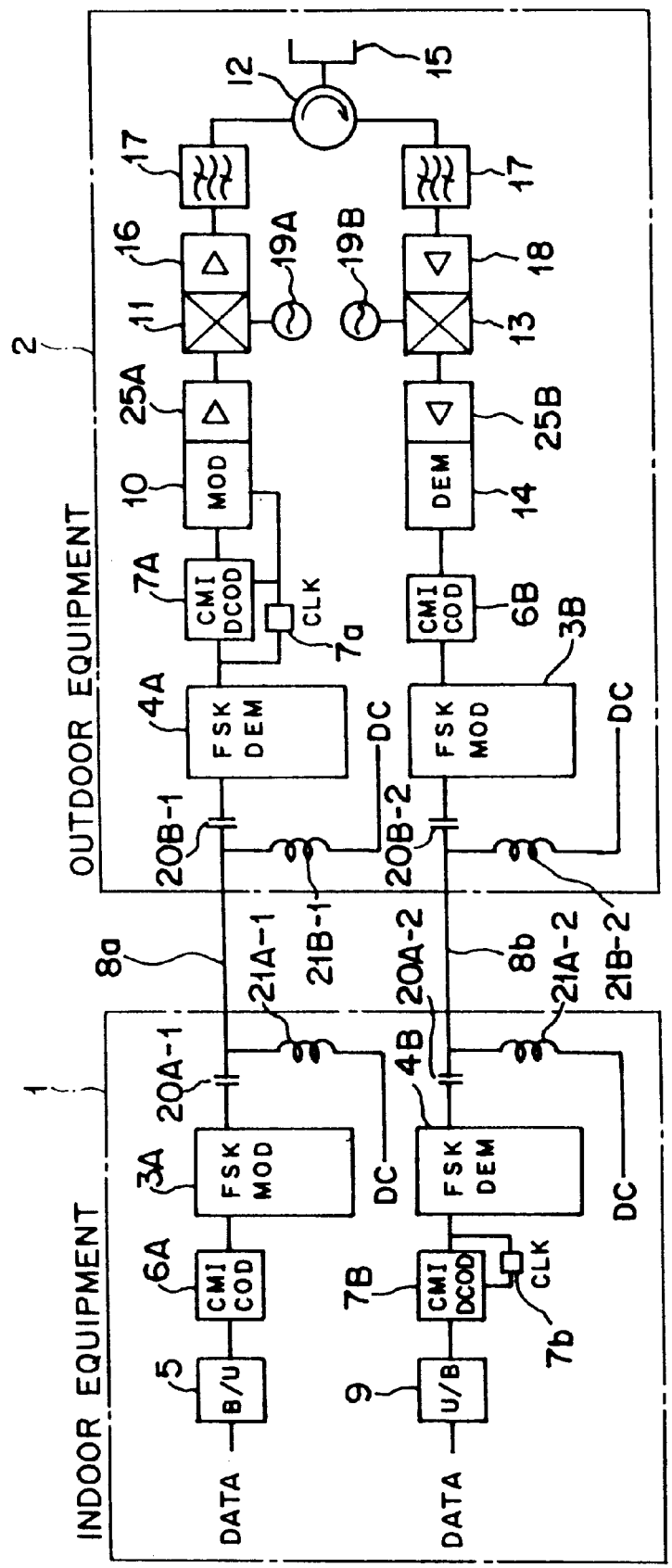
FIG. 5 is a block diagram showing a modification of the configuration of the first embodiment according to the present invention.

FIG. 4 is a block diagram showing the configuration of the digital signal transmitter/receiver equipment according to the first embodiment of the present invention. FIG. 5 is a block diagram showing a modification of the first embodiment.

Figure 14:
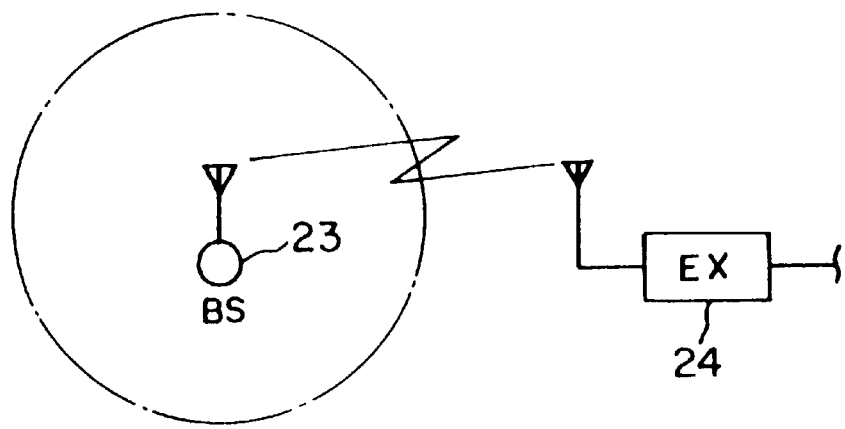
FIG. 14 is a schematic diagram showing a telecommunications aspect between a radio base station and an exchange.
Figure 15:
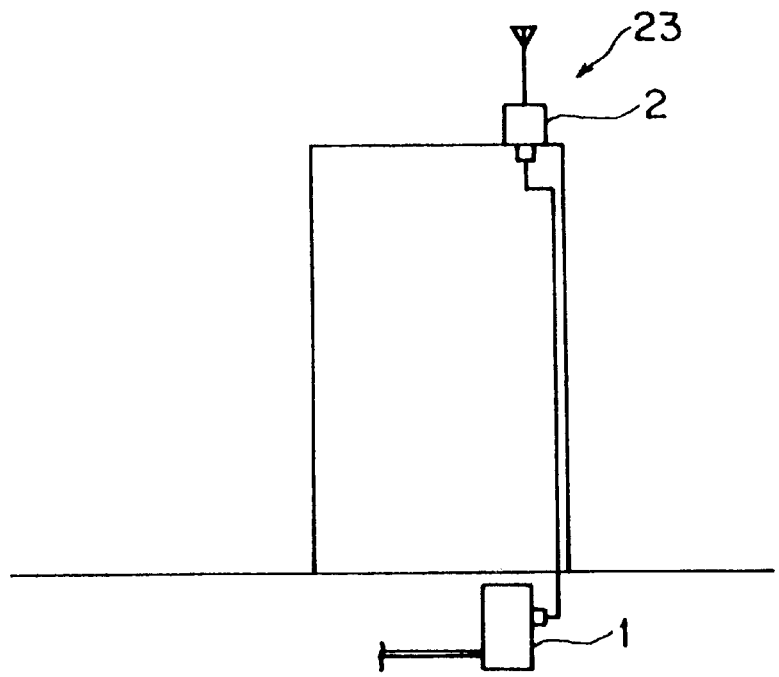
FIG. 15 is a schematic diagram showing a radio base station.

The digital signal transmitter/receiver equipment according to the present embodiment is applied to radio base stations and exchanges (numerals 23 and 24 in FIG. 14). Referring to FIG. 4, the digital transmitter/receiver equipment is constituted of an indoor equipment 1 acting as the first transmitter/receiver unit and an outdoor equipment 2 acting as the second transmitter/receiver unit. The indoor equipment 1 is linked to the outdoor equipment 2 via a single transmission line 8.

The indoor equipment 1 that processes previously generated digital signals is installed, for example, in the basement of a building. The outdoor equipment 2 that has an antenna 15 is installed, for example, on the roof of a building.

In the indoor equipment 1, the bipolar/unipolar (B/U) converting means 5, the CMI encoding means (CMI COD) 6A and the frequency-shift modulation unit (FSK MOD) 3A are arranged along the digital signal transmission path. The frequency-shift demodulation unit (FSK DEM) 4B, the CMI decoding means 7B and the unipolar/bipolar (U/B) converting means 9 are arranged along the digital signal receiving path. The indoor equipment 1 also includes the hybrid circuit 22A that performs a branching and combining operation of a transmission signal and a receive signal.

The B/U converting means 5 converts a digital signal (or a bipolar signal) processed in the indoor equipment 1 into a unipolar signal and then transmits the resultant signal. The CMI encoding means 6 subjects the unipolar signal to a code mark inversion (CMI) encoding.

The frequency-shift modulation unit 3A subjects an input data signal to a FSK modulation (frequency-shift modulation) and then outputs a digital signal transmitted between the indoor equipment 1 and the outdoor equipment 2, the digital signal having a value lower than the intermediate frequency (IF) at the frequency conversion process handled in the indoor equipment 2.

The hybrid circuit 22A inputs the digital signal from the frequency-shift modulation unit 3A and then combines it with the received signal. The combined signal is transmitted to the outdoor equipment 2 via the shared sending/receiving transmission line (cable) 8.

In the combined signal, the transmission data with a frequency lower than the intermediate frequency is transmitted to the outdoor equipment 2, nearly without attenuating signals in the transmission line 8.

The hybrid circuit 22B inputs again data transmitted to the outdoor equipment 2 and branches into a transmission signal and a receive signal. The transmission data is transmitted from the antenna unit 15 via the frequency-shift demodulation unit (FSK DEM) 4A, the CMI decoding means (CMI DCOD) 7A, the main modulation unit (MOD) 10, the frequency converting unit (up-converter) 11, the high-power amplifier 16, and the bandpass filter 17 in the outdoor equipment 2.

The frequency-shift demodulation unit 4A demodulates the digital signal subjected to the FSK modulation in the frequency-shift modulation unit 3A within the indoor equipment 1. The CMI decoding means 7A decodes the signal encoded by the CMI encoding means 6A in the indoor equipment 1. The clock extracting unit 7a in the CMI decoding means 7A synchronizes timely the CMI decoding means 7A and the main modulation unit 10 in accordance with the CMI encoded signal from the CMI encoding means 6A in the indoor equipment 1.

The main modulation unit 10 modulates the input baseband signal into an IF (intermediate) frequency band signal. The modulated signal from the main modulation unit 10 is amplified by the amplifier 25A arranged integrally to the main modulation unit 10.

The frequency conversion unit 11 frequency-converts the digital signal in the IF frequency band into a signal in the RF frequency band, in response to the local signal from the local oscillator 19. The converted signal is amplified by the high-power amplifier 16 and then the resultant signal is transmitted from the antenna unit 15 via the bandpass filter 17 and the circulator 12.

On the other hand, the data received by the antenna unit 15 is transmitted to the indoor equipment 1 via the bandpass filter 17, the low-noise amplifier 18, the frequency converting unit (down-converter) 13, the main demodulation unit (DEM) 11, the CMI encoding means 6B, and the frequency-shift modulation unit (FSK MOD) 3B in the outdoor equipment 2.

That is, the received data is input via the bandpass filter 17 and the circulator 12 and then amplified by the low-noise amplifier 18.

The bandpass filter 17 is a filter passing only signals in a specific frequency band. The signal from the low-noise amplifier 18 is input to the frequency-shift conversion unit 13. In the reverse way to that of the frequency conversion unit 11, the frequency conversion unit 13 converts the receive digital signal in the RF frequency band into the signal in the IF frequency band, in response to the local signal from the local oscillator 19.

The amplifier 25B arranged integrally to the main demodulation unit 14 amplifies the receive data and then the main demodulation unit 14 demodulates the resultant data into the signal in the baseband. The demodulated signal is subjected to a CMI encoding process by the CMI encoding means 6B.

Moreover, the received CMI encoded data is subjected to a FSK modulation by the frequency-shift modulation unit 3B. Thus, the receive data is modulated to a signal of a lower frequency than the intermediate frequency. Thereafter, the hybrid circuit 22B combines the transmission data with the receive data to input the resultant receive data to the indoor equipment 1 via the transmission line 8.

The receive data modulated to a frequency lower than the intermediate frequency can be transmitted to the indoor equipment 1, nearly without being attenuated in the transmission line 8.

The hybrid circuit 22A in the indoor equipment 1 branches the receive data into different signals. The branched signal is subjected to a digital process via the frequency-shift demodulation unit 4B, the CMI decoding means 7B, and the U/B converting means 9.

In the reverse way of the B/U converting means 5, the U/B converting means 9 converts the input digital signal from a unipolar signal to a bipolar signal. Hence, the U/B converting means 9 converts the unipolar signal from the CMI decoding means 7B into a bipolar signal. Thereafter, the receive data is subjected to various digital processes.

The frequency-shift demodulation unit 4B and the CMI decoding means 7B in the indoor equipment 1 corresponds to the frequency-shift demodulation unit 4A and the CMI decoding means 7A, respectively. Hence, the duplicate explanation will be omitted here.

Numerals 20A and 20B represent capacitors and 21A and 21B represent coils each one end of which is connected to a DC power source. The signal transmission between the indoor equipment 1 and the outdoor equipment 2 is carried out with the transmission line 8 on which the DC power source is applied.

According to the configuration of the first embodiment of the present invention, each of the hybrid circuits 22A and 22B subjects the transmission data and the receive data transmitted between the indoor equipment 1 and the outdoor equipment 2 to a combining and branching process and a FSK modulating process. Hence, there is an advantage in that the signal attenuation due to an extended transmission line can be suppressed so that the signal distortion can be prevented. Moreover, laying a signal transmission line 8 between the indoor equipment 1 and the outdoor equipment 2 results in a reduced cabling cost.

Hence, even when a radio base station (or an exchange) is installed in a general building, the installation places for the indoor equipment 1 and the outdoor equipment 2 do not restrict laying a transmission line, whereby the freedom of installation can be largely increased. This feature allows radio base stations to be installed in most buildings.

In the first embodiment, as shown in FIG. 5, the two-local system using the local oscillators 19A and 19B may be used to connect the indoor equipment to the outdoor equipment.

In the brief explanation of the modification of the digital signal transmitter/receiver equipment shown in FIG. 5, the indoor equipment 1 is connected to the outdoor equipment via both the sending transmission line 8a and the receiving transmission line 8b.

In the indoor equipment 1, the digital signal from the frequency-shift modulation unit 3A is transmitted to the outdoor equipment 2 via the sending transmission line 8a. The transmission data which has a frequency lower than the intermediate frequency can be transmitted to the outdoor equipment 2 substantially with no signal attenuation in the transmission line 8a.

In the outdoor equipment 2, the receive data is transmitted via the antenna 15 via the frequency-shift demodulation unit 4A, the CMI decoding means 7A, the main modulation unit 10, the frequency conversion unit 11 with the local oscillator 19A, the high-power amplifier 16, and the bandpass filter 17.

On the other hand, in the outdoor equipment 2, data received by the antenna 15 is transmitted to the indoor equipment 1 via the bandpass filter 17, the low-noise amplifier 18, the frequency conversion unit 13 with the local oscillator 19B having an oscillation frequency different from that of the local oscillator 19A, the main demodulation unit 14, the CMI encoding means 6B, and the frequency-shift modulation unit 3B.

In other words, the frequency-shift modulation unit 3B subjects the receive data to a FSK modulation to transmit the outcome to the indoor equipment 1 via the receiving transmission line 8b. Since the receive data has a lower frequency than the intermediate frequency, the transmission line 8b transmits it with nearly no signal attenuation.

Figure 11:
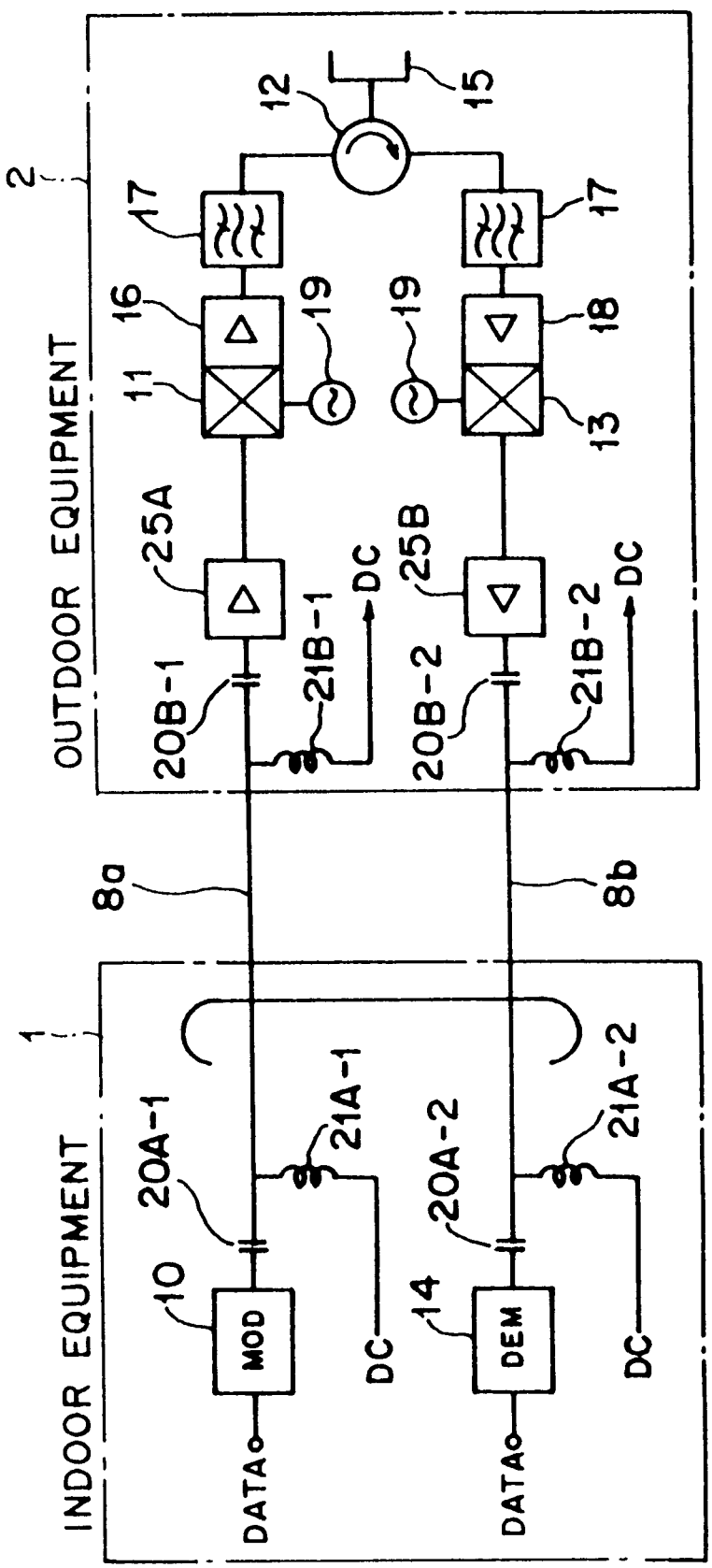
FIG. 11 is a block diagram showing the configuration of a digital signal transmitter and receiver equipment.
Figure 12:
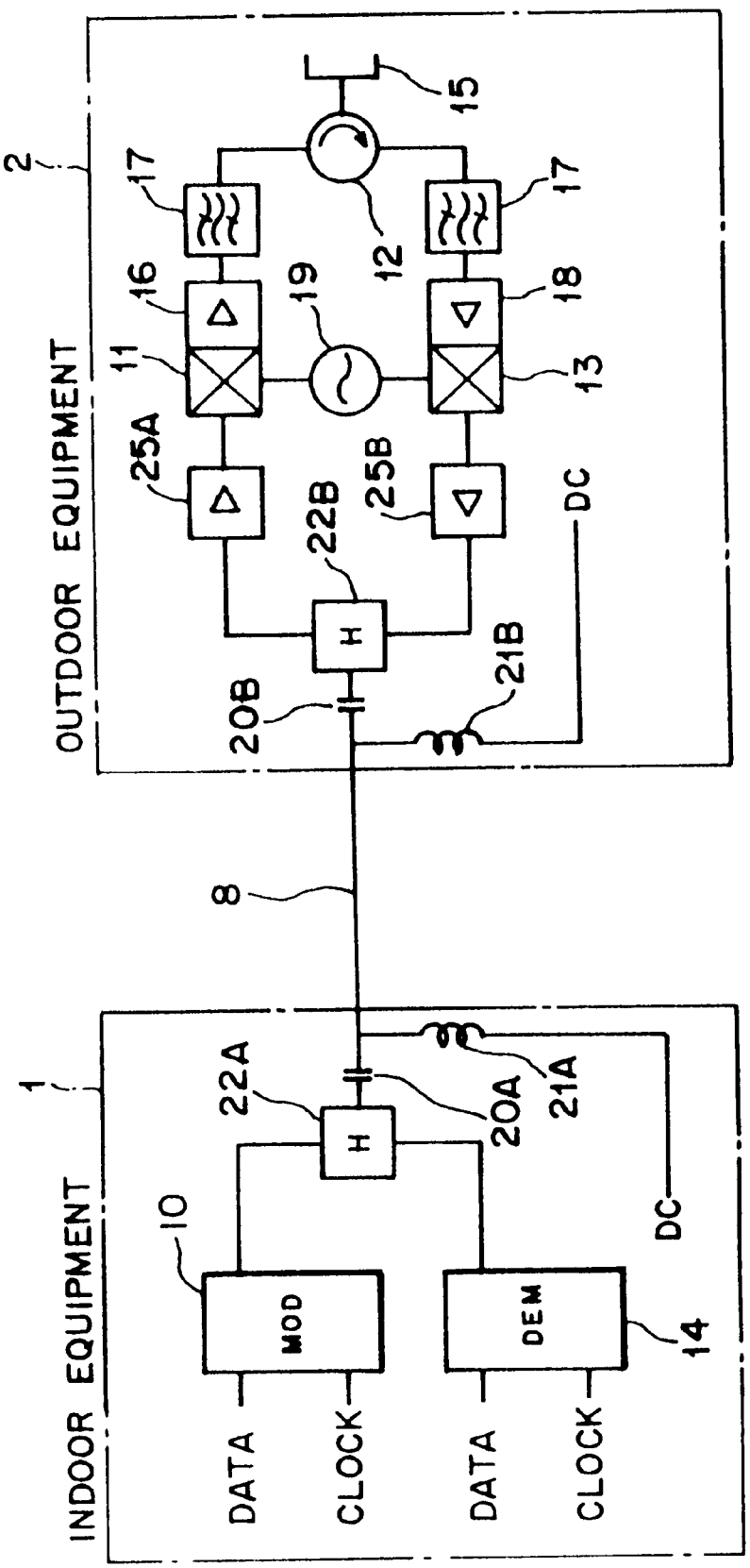
FIG. 12 is a block diagram showing the configuration of a digital signal transmitter and receiver equipment.
Figure 13:
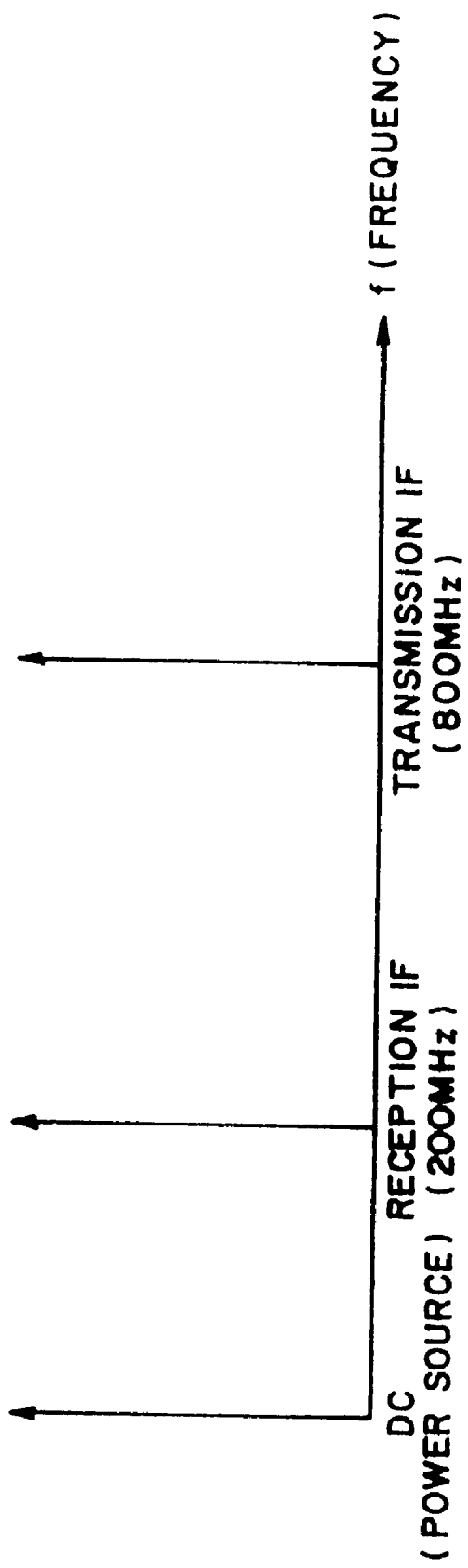
FIG. 13 is a diagram showing the spectrum distribution of transmit and receive IF signals.

As described above, in the two-local system, the digital signal between the indoor equipment 1 and the outdoor equipment 2 subjected to a FSK modulation can eliminate the signal attenuation due to the transmission line 8a and 8b. Unlike the two-local system shown in FIG. 11, the present two-local system does not require the main modulation unit 10 in the indoor equipment 1 and the frequency conversion unit 11 in the outdoor equipment 2. In addition, the present two-local system can install the main modulation unit 10 in the outdoor equipment 2, together with the frequency conversion unit 11, thus realizing easy fabrication as a unit of each of the indoor equipment 1 and the outdoor equipment 2, easy-maintenance and reduced manufacturing cost.

(c) Description of the Second Embodiment of the Present Invention:

Next, the second embodiment according to the present invention will be explained.

Figure 6:
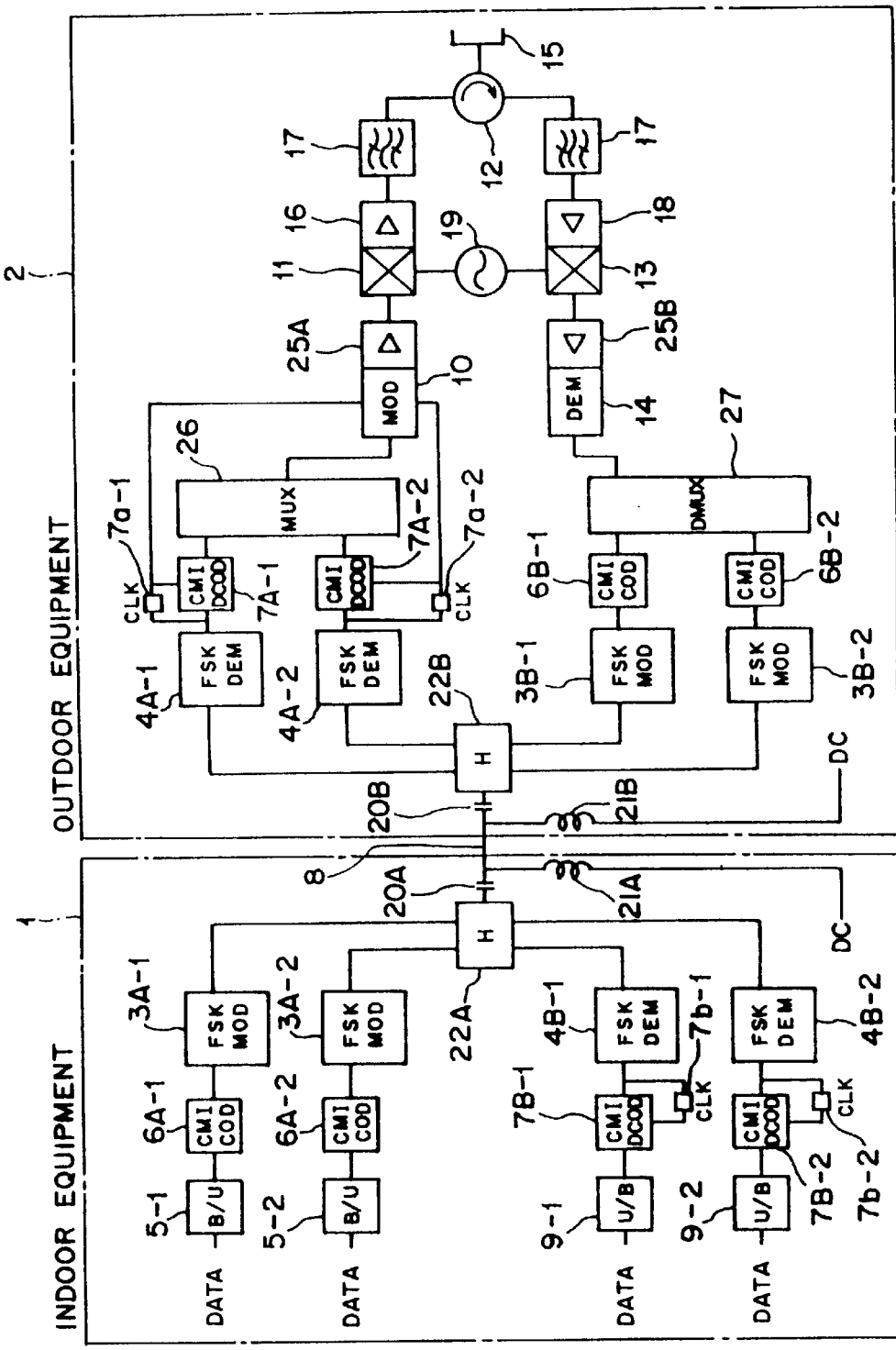
FIG. 6 is a block diagram showing the configuration of the second embodiment according to the present invention.
Figure 7:
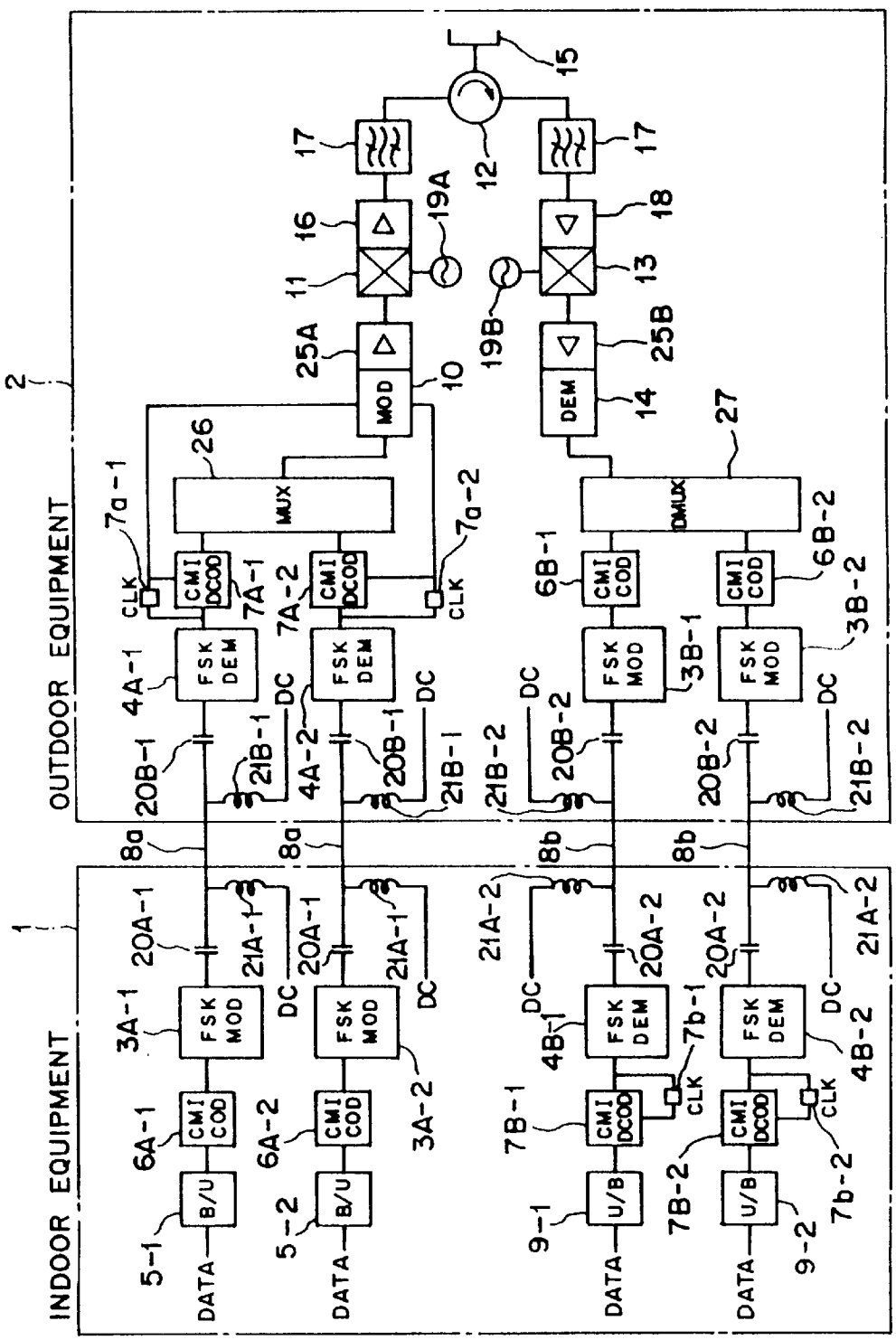
FIG. 7 is a block diagram showing a modification of the configuration of the second embodiment according to the present invention.

FIG. 6 is a block diagram showing the configuration of the digital signal transmitter/receiver equipment of the second embodiment according to the present invention. FIG. 7 is a block diagram showing a modification of the second embodiment.

Unlike the first embodiment, the indoor equipment 1 includes in the second embodiment 2 plural transmission systems and receiving systems.

As shown in FIG. 6, the indoor equipment 1 includes the two-system digital signal output (data transmitting) path and the two-system digital signal input (data receiving) path.

The bipolar/unipolar converting unit 5-1, the CMI encoding means 6A-1 and the frequency-shift modulation unit (FSK MOD) 3A-1 as well as the bipolar/unipolar converting unit 5-2, the CMI encoding means 6A-2, the frequency-shift modulation unit (FSK MOD) 3A-2 are arranged along the digital signal transmitting paths in the indoor equipment 1, respectively. The frequency-shift demodulation unit (FSK DEM) 4B-1, the CMI decoding means 7B-1 and the unipolar/bipolar converting means (U/B converting means) 9-1 as well as the frequency-shift demodulation unit (FSK DEM) 4B-2, the CMI decoding means 7B-2 and the unipolar/bipolar converting means (U/B converting means) 9-2 are arranged along the digital signal receiving paths, respectively.

The indoor equipment 1 also includes the hybrid circuit 22A that performs a branching and combining operation of transmission signals and receive signals.

In each digital signal transmission path, each of the B/U converting means 5-1 and 5-2 converts a bipolar signal into a unipolar signal. Each of the CMI encoding means 6A-1 and 6A-2 encodes the unipolar signal.

In each of the frequency-shift modulation units 3A-1 and 3A-2, the digital signal is modulated into a signal of a frequency lower than the intermediate (IF) frequency at a frequency conversion processed in the outdoor equipment 2. Each of the frequency-shift modulating units 3A-1 and 3A-2 performs a conversion process at a different frequency in each transmission path.

The hybrid circuit 22A combines the digital signal from each of the frequency-shift modulating units 3A-1 and 3A-2 with the signal from the receiving side to transmit the combined signal to the outdoor equipment 2 via the sending and receiving transmission line (cable) 8.

The transmission data that is transmitted at a lower frequency than the intermediate frequency along each transmission path can be transmitted to the outdoor equipment 2 nearly with no signal attenuation in the transmission line 8.

The hybrid circuit 22B inputs the data transmitted to the outdoor equipment 2 and branches it corresponding to the signal system in the indoor equipment 1. In this case, the transmission path is divided into two branches.

The transmission data is transmitted from the antenna unit 15 via the frequency-shift demodulation units 4A-1 and 4A-2, the CMI decoding means 7A-1 and 7A-2, the multiplexer (MUX) 26, the main modulation unit 10, the frequency conversion unit 11, the high-power amplifier 16, and the bandpass filter 17 arranged in the outdoor equipment 2.

In other words, the frequency-shift demodulation unit 4A-1 demodulates a piece of transmission data from the hybrid circuit 22B in the outdoor equipment 2 into the digital signal FSK-modulated by the frequency-shift modulation unit 3A-1 in the indoor equipment 1. The frequency-shift demodulation unit 4A-2 demodulates a piece of transmission data from the hybrid circuit 22B in the outdoor equipment 2 into the digital signal FSK-modulated by the frequency-shift modulation unit 3A-2 in the indoor equipment 1.

The CMI decoding means 7A-1 demodulates the signal encoded by the CMI encoding means 6A-1. The CMI decoding means 7A-2 demodulates the signal encoded by the CMI encoding means 6A-2. The CMI decoding means 7 includes the clock extracting units 7a-1 and 7a-2. The clock extracting unit 7a-1 and 7a-2 synchronize the CMI decoding means 7A-1 and 7A-2 and the main modulation unit 10 with the signals CMI-encoded by the CMI encoding means 6A-1 and 6A-2 in the indoor equipment 1, respectively.

The multiplexer 26 arranged in the rear stage of each CMI decoding means 7 multiplexes the two-system data to output unified data to the main modulation unit 10. The multiplexer 26 multiplexes the plural transmission systems into a single transmission system.

The main modulation unit 10 inputs the multiplex transmission data to modulate it into an IF (intermediate) frequency signal. The modulated signal is amplified by the amplifier 25A integrally mounted to the main modulation unit 10.

The frequency conversion unit 11 frequency-converts the digital signal from the IF frequency band to the RF frequency band, in response to the local signal from the local oscillator 19. The high-power amplifier 16 amplifies the converted signal. Then, the resultant signal is transmitted from the antenna unit 15 via the bandpass filter 17 and the circulator 12.

On the other hand, the data received by the antenna unit 15 is transmitted via the bandpass filter 17, the low-noise amplifier 18, the frequency conversion unit 13, and the main demodulation unit 14 arranged in the outdoor equipment 2. Then the demultiplexer separates the data into two systems. One piece of the data is transmitted to the indoor equipment 1 via the CMI encoding means 6B-1 and the frequency-shift modulation unit 3B-1. The other piece of the data is transmitted to the indoor equipment 1 via the CMI encoding means 6B-2 and the frequency-shift modulation unit 3B-2.

In other words, the low-noise amplifier 18 inputs the receive data via the bandpass filter 17 and the circulator 12 and amplifies it.

The frequency conversion unit 13 frequency-converts the digital signal in the RF frequency band from the low-noise amplifier 18 into a signal in the IF frequency band, in response to the local signal from the local oscillator 19 with the same specification as that in the transmission system.

After the amplifier 25 arranged integrally to the main demodulation unit 14 amplifies the receive data, the main demodulation unit 14 modulates the resultant data to data in the baseband. Then the demultiplexer (DMUX) 27 separates the receive data transmission path into plural transmission paths (two-systems).

The CMI encoding means 6B-1 and 6B-2 are arranged along the separated receive data paths, respectively, to subject receive data to a CMI encoding process.

Moreover, the CMI encoded receive data are input to the frequency-shift modulation unit 3B-1 and 3B-2 arranged along the transmission paths, respectively, to perform the FSK modulation at a different frequency. Each of the receive data is modulated to a frequency lower than the intermediate frequency. Thereafter, the hybrid circuit 22B combines two pieces of the modulated data and then transmits the outcome to the indoor equipment 1 via the transmission line 8.

As described above, since the receive data is modulated to a frequency lower than the intermediate frequency, it can be transmitted to the indoor equipment 1 substantially with no signal attenuation in the transmission line 8.

The hybrid circuit 22A in the indoor equipment 1 is branched corresponding to the signal transmission systems for the receive data in the outdoor equipment 2. In this case, the receiving transmission path is divided into two branches.

Thereafter, two pieces of the branched receive data are subjected respectively to a digital signal process via the frequency-shift demodulation unit 4B-1, the CMI decoding means 7B-1, and the U/B converting means 9-1 and via the frequency-shift demodulation unit 4B-2, the CMI decoding means 7B-2, and the U/B converting means 9-2. Then, the receive data are further subjected to various digital processes.

Numerals 20A and 20B represent capacitors and 21A and 21B represent coils of which one ends are connected to a DC power source. The signal transmission is carried out between the indoor equipment 1 and the outdoor equipment 2 with the transmission line 8 supplied with the DC power source.

According to the second embodiment having the configuration described above, like the first embodiment, the FSK signal transmission between the indoor equipment 1 and the outdoor equipment 2 is carried out prior to the main modulation and demodulation processes while the transmission data and the receive data combined and branched by the hybrid circuits 22A and 22B are exchanged between the indoor equipment and the outdoor equipment. Therefore, there is an advantage in that the signal attenuation can be suppressed even in an extended transmission line so that the signal distortion can be prevented. Moreover, the single transmission line 8 can link the indoor equipment 1 to the outdoor equipment 2, thus reducing the cable laying cost. Hence, where radio base stations (or exchanges) are installed in general buildings, the limitation to the installation places for the indoor equipment 1 and the outdoor equipment 2 due to the length of the transmission line can be removed so that the freedom for installation can be improved. This feature allows radio base stations to be installed in most buildings.

Arranging the multiplexer 26 and the demultiplexer 27 in the second transmitter/receiver equipment enables arranging a plurality of data transmission systems and data receiving systems in the first transmitter/receiver equipment.

In the modification of the second embodiment, as shown in FIG. 7, the two-local system in which the local oscillators 19A and 19B are employed can be used to connect the indoor equipment 1 to the outdoor equipment 2. In other words, plural independent input/output systems can be connected using the transmission line 8a and 8b.

The above configuration can further simplify the entire structure of the indoor equipment 1 and the outdoor equipment 2 by omitting the hybrid circuits 22A and 22B.

Moreover, the configuration can reduce the signal attenuation in the transmission lines 8a and 8b because of the use of the FSK-modulated digital signal between the indoor equipment 1 and the outdoor equipment 2.

Figure 8:
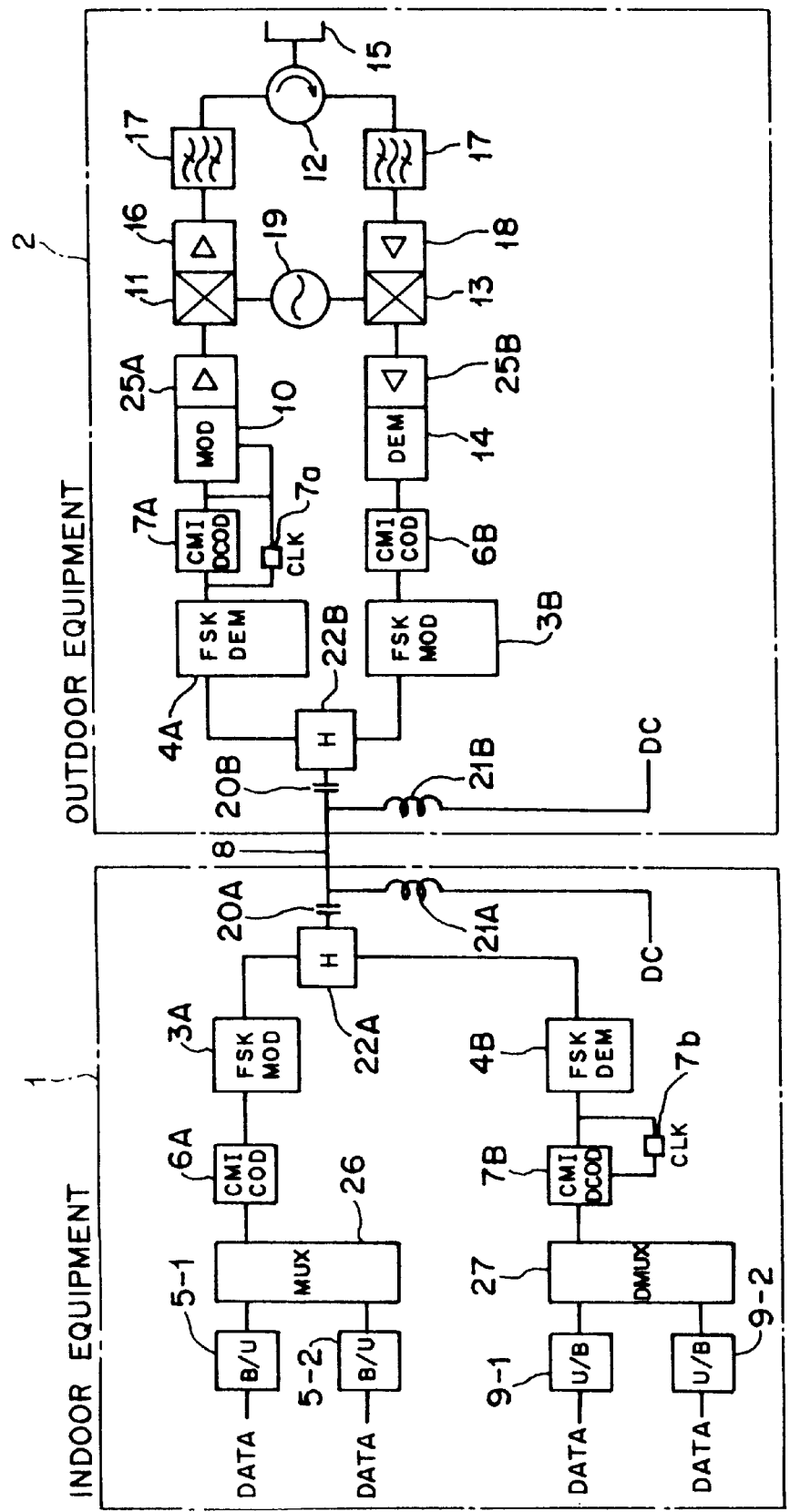
FIG. 8 is a block diagram showing the configuration of the third embodiment according to the present invention.
Figure 9:
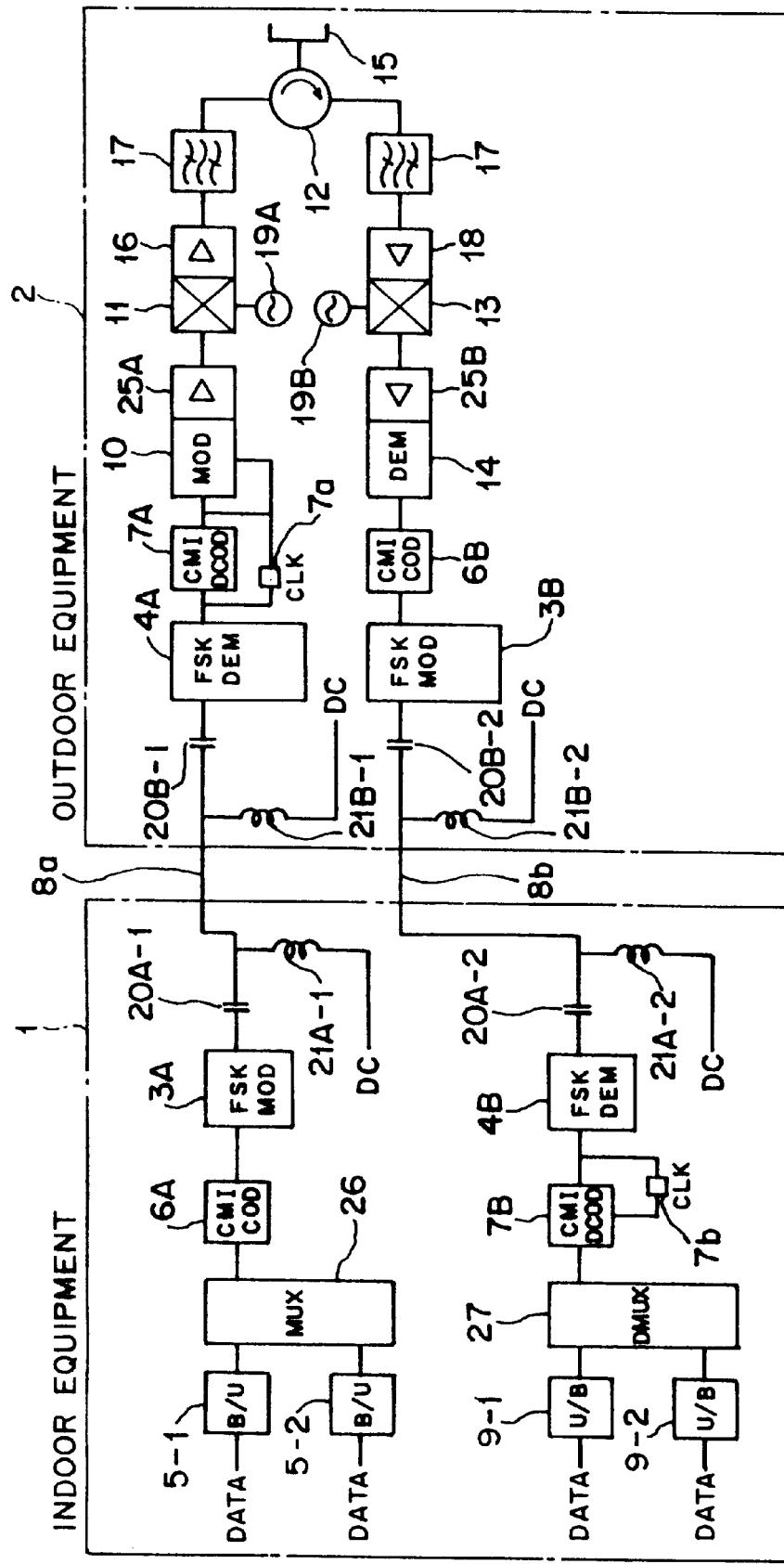
FIG. 9 is a block diagram showing a modification of the configuration of the third embodiment according to the present invention.
Figure 10:
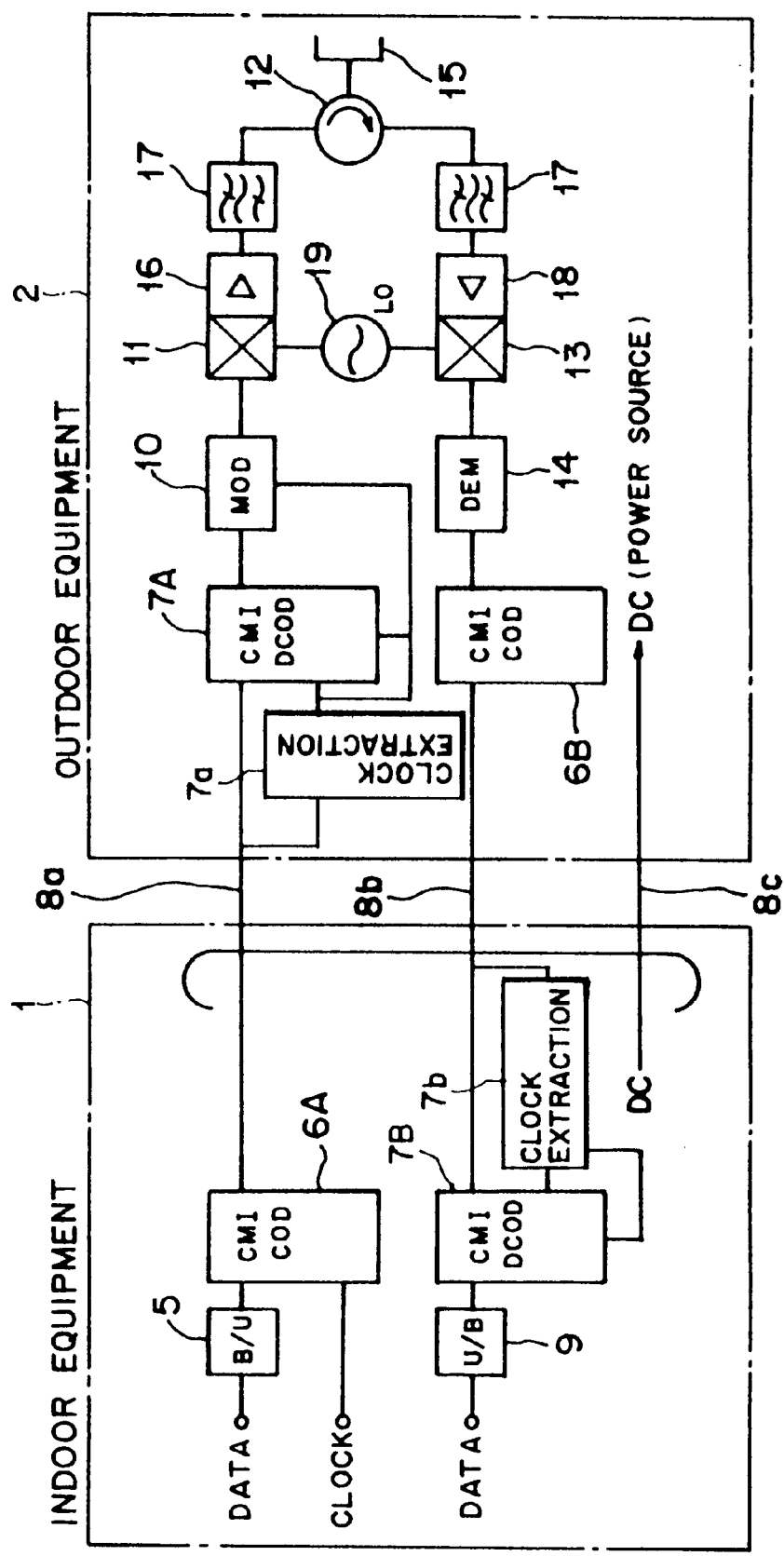
FIG. 10 is a block diagram showing the configuration of a digital signal transmitter and receiver equipment.

(d) Description of the Third Embodiment of the Present Invention:

Next, the third embodiment according to the present invention will be explained below. FIG. 8 is a block diagram showing the digital signal transmitter/receiver equipment according to the third embodiment of the present invention. FIG. 9 is a block diagram showing a modification of the third embodiment.

In the third embodiment, the indoor equipment having plural input systems and output systems is shown, like the second embodiment.

As shown in FIG. 8, the indoor equipment 1 includes a two-digital signal output (data sending) path system and a two-digital signal input (data receiving) path system. In the third embodiment, the bipolar/unipolar (B/U) converting means 5 is arranged along each digital signal transmission path in the indoor equipment 1. The multiplexer 26 is arranged in the rear stage of the B/U converting means 5. The multiplexer 26 multiplexes data in two systems and then transmits data unified to one system to the main modulation unit 10.

The CMI encoding means 6A encodes the digital signal unified by the multiplexer 26. Then, the frequency-shift modulation unit 3A modulates the converted digital signal to the signal of a frequency lower than the intermediate (IF) frequency band.

The indoor equipment 1 includes the hybrid circuit 22A that branches and combines the transmission signal and the receive signal. The hybrid circuit 22A combines the digital signal from the frequency-shift modulation unit 3A with the signal on the receiving side and then transmits the combined signal to the outdoor equipment 2 via the transmission line (cable) 8 shared for transmission and reception.

The transmission data of a frequency lower than the intermediate frequency can be transmitted to the outdoor equipment without undergoing significant signal attenuation in the transmission line 8.

The hybrid circuit 22B inputs data transmitted to the outdoor equipment 2 to subject a transmission signal and a receive signal to a branching process. In the outdoor equipment 2, the frequency-shift demodulation unit 4A demodulates one transmission data output from the hybrid circuit 22B. As for one transmission data output from the hybrid circuit 22B in the indoor equipment 1, the frequency-shift modulation unit 4A demodulates the digital signal FSK modulated by the frequency-shift modulation unit 3A in the indoor equipment 1.

The CMI decoding means 7A decodes a signal decoded by the CMI encoding means 6A. The CMI decoding means 7A with the clock extracting unit 7a synchronizes timely the CMI decoding means 7A and the main modulation unit 10 in accordance with the signal CMI-encoded by the CMI encoding means 6A in the indoor equipment 1.

The main modulation unit 10 modulates the transmission data to a signal in the IF (intermediate) frequency band. Then the modulated signal is amplified by the amplifier 25A arranged integrally with the main modulation unit 10. Thereafter, the frequency conversion unit 11 receives the transmission data and frequency-converts the digital signal from the IF frequency band to the RF frequency band, in accordance with the local signal from the local oscillator 19.

The signal is amplified by the high-power amplifier 16 and then the outcome is transmitted from the antenna unit 15 via the bandpass filter 17 and the circulator 12.

On the other hand, the data received with the antenna unit 15 is transmitted to the indoor equipment 1 via the bandpass filter 17, the low-noise amplifier 18, the frequency conversion unit 13, and the main demodulation unit 14, the CMI encoding means 6B, and the frequency-shift modulation unit 3B.

That is, the low-noise amplifier 18 amplifies the receive data via the bandpass filter 17 and the circulator 12.

The frequency conversion unit 13 frequency-converts the receive signal from the low-noise amplifier 18 from the RF frequency band to the IF frequency band in response to local frequency signal from the local oscillator 19 with the same specification as that for transmission.

The amplifier 25B arranged integrally with the main demodulation unit 14 amplifies the receive data and then the main demodulation unit 14 modulates the amplified signal into a signal in the baseband. The CMI encoding means 6B subjects the receive data to a CMI encoding process.

The frequency-shift modulation unit 3B further subjects the CMI-encoded receive data to a FSK modulation, the data having a frequency lower than the intermediate frequency. Thereafter, the hybrid circuit 22B combines the transmission data with the receive data and then transmits the outcome to the indoor equipment 1 via the transmission line 8.

The receive data modulated to a frequency lower than the intermediate frequency can be transmitted to the indoor equipment 1 nearly with no signal attenuation in the transmission line 8. In the indoor equipment 1, the hybrid circuit 22A separates the receive data from the transmission data. Then, the digital signal is demodulated via the frequency-shift demodulation unit 4B, the CMI decoding means 7B, and the U/B converting means 9 while it is subjected to the CMI decoding process.

As shown in FIG. 8, the demultiplexer 27 that separates a one-signal receiving system into a two-signal receiving system is arranged at the rear stage of the CMI decoding means 7 to separate receive data into plural pieces of data.

The U/B converting means 9 in each receiving system converts a unipolar signal into a bipolar signal.

Then, the receive data is subjected to various digital processes.

Numerals 20A and 20B represent capacitors and 21A and 21B represent coils each of which one end is connected to the DC power source.

The configuration of the third embodiment according to the present invention can provide the same effect and advantage as the first embodiment. In the third embodiment, since the indoor equipment 1 includes the multiplexer 26 and the demultiplexer 27, the number of each of the CMI encoding means 6 and the CMI decoding means 7 can be halved to a simplified configuration, as compared to the second embodiment.

In the modification of the third embodiment, as shown in FIG. 9, the two-local system using local oscillators 19A and 19B can be employed to connect the indoor equipment 1 to the outdoor equipment 2. That is, plural input/output systems can be connected to the independent transmission lines 8a and 8b, respectively.

As described above, since the configuration can eliminate the hybrid circuits 22A and 22B, it can simplify structurally the indoor equipment 1 and the outdoor equipment 2. Moreover, the configuration subjects the digital signal between the indoor equipment 1 and the outdoor equipment 2 to a FSK modulation, thus eliminating most signal attenuation due to the transmission lines 8a and 8b.

What is claimed is:

1. A digital signal transmitting method for transmitting digital signals to outside of a digital signal transmitter separately including a first transmitter and a second transmitter connected to the first transmitter via a transfer line to which a dc power source is connected, said method comprising the steps of:

(a) frequency shift keying (FSK) modulating the digital signals to a lower frequency than an intermediate frequency in the first transmitter to enable the transfer of said digital signals of said lower frequency from the first transmitter to the second transmitter through the transfer line;

(b) FSK demodulating the FSK-modulated digital signals of said lower frequency in the second transmitter upon transfer of the digital signals from the first transmitter to the second transmitter via the transfer line;

(c) modulating the FSK-demodulated digital signals of said lower frequency into those of said intermediate frequency in the second transmitter; and (d) converting said intermediate frequency of the digital signals to a higher frequency in the second transmitter for transmitting the digital signals to outside of the digital signal transmitter.

2. A digital signal receiving method for receiving digital signals from outside of a digital signal receiver separately including a first receiver and a second receiver connected to the first receiver via a transfer line to which a dc power source is connected, said method comprising the steps of:

(a) converting a frequency of digital signals received by the first receiver from the outside the digital signal receiver into an intermediate frequency from a higher frequency;

(b) demodulating said intermediate frequency of the digital signals to a lower frequency in the first receiver;

(c) frequency shift keying (FSK) modulating the digital signals of said lower frequency in the first receiver to enable the transfer of said digital signals of said lower frequency from the first receiver to the second receiver through the transfer line; and (d) FSK demodulating the FSK-modulated digital signals of said lower frequency in the second receiver upon transfer of the digital signals from the first receiver to the second receiver via the transfer line.

3. A digital signal transmitter/receiver system in a multi-equipment form for transmitting and receiving between one digital signal transmitter/receiver equipment and another identical digital signal transmitter/receiver equipment, each digital signal transmitter/receiver equipment separately comprising:

a first transmitter/receiver unit and a second transmitter/receiver unit connected to said first transmitter/receiver unit via a transfer line, to which a dc power source is connected;

a first frequency shift keying (FSK) modulation unit in said first transmitter/receiver unit for FSK modulating digital signals to a lower transmitting frequency than an intermediate transmitting frequency for transferring the digital signals from said first transmitter/receiver unit to said second transmitter/receiver unit via said transfer line;

a first FSK demodulation unit in said second transmitter/receiver unit for FSK demodulating the digital signals of said lower transmitting frequency, which are transferred from said first transmitter/receiver unit to said second transmitter/receiver unit via said transmission line;

a modulation unit disposed in said second transmitter/receiver unit for modulating said lower transmitting frequency of the FSK-demodulated digital signals output from said FSK demodulation unit to said intermediate transmitting frequency;

a first converter in said second transmitter/receiver unit for converting said intermediate transmitting frequency of the digital signals into a higher transmitting frequency for transmitting the digital signals from said one transmitter/receiver equipment;

a second converter in said second transmitter/receiver unit for converting a receiving frequency of the digital signals, which are received from outside of said one transmitter/receiver equipment, from a higher receiving frequency to an intermediate receiving frequency lower than said higher receiving frequency;

a demodulation unit disposed in said second transmitter/receiver unit for demodulating said intermediate receiving frequency of the digital signals output from said second converter into a lower receiving frequency;

a second FSK modulation unit in said second transmitter/receiver unit for FSK modulating the digital signals of said lower receiving frequency output from said demodulation unit for transferring the digital signals from said second transmitter/receiver unit to said first transmitter/receiver unit via said transfer line; and a second FSK demodulation unit in said first transmitter/receiver unit for FSK demodulating the digital signals of said lower receiving frequency.

4. Digital signal transmitter/receiver equipment separately including a first transmitter/receiver unit and a second transmitter/receiver unit connected to said first transmitter/receiver unit via a transfer line to which a dc power source is connected, said equipment comprising:

a first frequency shift keying (FSK) modulation unit, in said first transmitter/receiver unit for FSK modulating digital signals to a lower transmitting frequency than an intermediate transmitting frequency for transferring the digital signals from said first transmitter/receiver unit to said second transmitter/receiver unit via said transfer line;

a first FSK demodulation unit in said second transmitter/receiver unit for FSK demodulating the digital signals of said lower transmitting frequency, which are transferred from said first transmitter/receiver unit to said second transmitter/receiver unit via said transfer line;

a modulation unit disposed in said second transmitter/receiver unit for modulating said lower transmitting frequency of the FSK-demodulated digital signals output from said FSK demodulation unit to said intermediate transmitting frequency;

a first converter in said second transmitter/receiver unit for converting said intermediate transmitting frequency of the digital signals into a higher transmitting frequency for transmission of the digital signals from said transmitter/receiver equipment;

a second convertor in said second transmitter/receiver unit for converting a receiving frequency of digital signals which are received from outside of said transmitter/receiver equipment, from a higher receiving frequency to an intermediate receiving frequency lower than said higher receiving frequency;

a demodulation unit disposed in said second transmitter/receiver unit for demodulating said intermediate receiving frequency of the digital signals output from second converter into a lower receiving frequency;

a second FSK modulation unit in said second transmitter/receiver unit for FSK modulating the digital signals of said lower receiving frequency output from said demodulation unit for transferring the digital signals from said second transmitter/receiver unit to said first transmitter/receiver unit via said transfer line; and a second FSK demodulation unit in said first transmitter/receiver unit for FSK demodulating the digital signals of said lower receiving frequency.

5. A digital signal transmitter separately including a first transmitter and a second transmitter connected to said first transmitter via a transfer line, to which a dc power source is connected, comprising:

a frequency shift keying (FSK) modulation unit disposed in said first transmitter for FSK modulating digital signals to a lower frequency than an intermediate frequency to enable the transfer of said digital signals from said first transmitter to said second transmitter through the transfer line;

an FSK demodulation unit disposed in said second transmitter for FSK demodulating said FSK-modulated digital signals of said lower frequency transferred via the transfer line;

a modulation unit disposed in said second transmitter for modulating said FSK-demodulated digital signals of said lower frequency output from said FSK demodulation unit to said intermediate frequency; and a converter unit disposed in said second transmitter for converting said intermediate frequency of said digital signals to a higher frequency than said intermediate frequency.

6. A digital signal receiver separately including a first receiver and a second receiver connected to said first receiver via a transfer line, to which a dc power source is connected, comprising:

a converter unit disposed in said first receiver for converting a frequency of digital signals, which are received from outside said digital signal receiver, into an intermediate frequency from a higher frequency than said intermediate frequency;

a demodulation unit disposed in said first receiver for demodulating said intermediate frequency of said digital signals to a lower frequency;

a frequency shift keying (FSK) modulation unit disposed in said first receiver for FSK modulating said digital signals of said lower frequency to enable the transfer of said digital signals from said first receiver to said second receiver through the transfer line; and an FSK demodulation unit disposed in said second receiver for FSK demodulating said FSK-modulated digital signals of said lower frequency transferred via the transfer line.

7. A digital signal transmitter/receiver system comprising:

a digital signal transmitter separately including a first transmitter and a second transmitter connected to said first transmitter via a first transfer line, to which a first dc power source is connected, for transferring digital signals from said first transmitter to said second transmitter;

said digital signal transmitter further including a first frequency shift keying (FSK) modulation unit disposed in said first transmitter for FSK modulating said digital signals to a lower transmitting frequency than an intermediate transmitting frequency for transferring the digital signals from said first transmitter to said second transmitter;

a first FSK demodulation unit disposed in said second transmitter for FSK demodulating said FSK-modulated digital signals of said lower transmitting frequency;

a modulation unit disposed in said second transmitter for modulating said lower transmitting frequency of said digital signals output from said first FSK demodulation unit to said intermediate transmitting frequency;

a first converter unit disposed in said second transmitter for converting said intermediate transmitting frequency of said digital signals into a higher frequency than said intermediate transmitting frequency;

a digital signal receiver separately including a first receiver for receiving said digital signals of said higher frequency, which are transmitted from said second transmitter, and a second receiver connected to said first receiver via a second receiver connected to said first receiver via a second transfer line, to which a second dc power source is connected for transferring said the digital signals from said first receiver to said second receiver;

said digital signal receiver further including a second converter disposed in said first receiver for converting said higher frequency of the received digital signals into an intermediate receiving frequency lower than said higher frequency;

a demodulation unit disposed in said first receiver for demodulating said intermediate receiving frequency of said digital signals output from said second converter to a lower receiving frequency than said intermediate receiving frequency;

a second FSK modulation unit disposed in said first receiver for FSK modulating said digital signals of said lower receiving frequency for transferring said digital signals from said first receiver to said second receiver; and a second FSK demodulation unit disposed in said second receiver for FSK demodulating said FSK-modulated digital signals of said lower receiver frequency.

8. The digital signal transmitter/receiver equipment according to claim 4, wherein said transmission line between said first and second transmitter/receiver units comprises a transmission line shared for transmission and reception.

9. The digital signal transmitter/receiver equipment according to claim 4, wherein said transmission line between said first and second transmitter/receiver units comprises separately a sending transmission line and a receiving transmission line.

10. The digital signal transmitter according to claim 5, wherein said first transmitter includes bipolar/unipolar converting means and CMI encoding means that are connected to the front stage of said frequency-shift modulation unit, said bipolarlunipolar converting means converting a bipolar signal into a unipolar signal, said CMI coding means subjecting the unipolar signal converted by said bipolar/unipolar converting means to a CMI encoding process; and wherein said second transmitter includes CMI decoding means connected to the rear stage of said frequency-shift demodulation unit, for decoding the signal encoded by said CMI encoding means.

11. The digital signal receiver according to claim 6, wherein said first receiver includes CMI encoding means connected to the front stage of said frequency-shift modulation unit, for subjecting the demodulated unipolar signal to a CMI encoding process; and wherein said second receiver includes CMI decoding means and bipolar/unipolar converting means each connected to the rear stage of said frequency-shift demodulation unit, said CMI decoding means decoding the unipolar signal encoded by said CMI encoding means; and said unipolar/bipolar converting means converting a unipolar signal decoded by said CMI decoding means into a bipolar signal.

12. The digital signal transmitter/receiver system according to claim 7, wherein said first and second transmission lines are a single transmission line.

* * * * *

UNITED STATES PATENT AND TRADEMARK OFFICE
CERTIFICATE OF CORRECTION

PATENT NO.   : 6,021,163
DATED        : February 1, 2000
INVENTOR(S)  : Hoshi

It is certified that error appears in the above-identified patent and that said Letters Patent is hereby corrected as shown below:

Title page:
Under "[56] References Cited, U.S. PATENT DOCUMENTS" please delete "5,631,928 5/1997 Hossaer" and insert -- 5,631,928 5/1997 Hossner -- therefor.

Claim 9,
Line 4, delete "separatey"
Line 5, before "receiving" insert -- separate --

Signed and Sealed this

Twenty-fifth Day of September, 2001

Attest:

NICHOLAS P. GODICI
Attesting Officer      Acting Director of the United States Patent and Trademark Office